United States Patent [19]

Röder

[11] Patent Number: 4,694,139
[45] Date of Patent: Sep. 15, 1987

[54] GUIDANCE DEVICE FOR A LASER BEAM FOR THREE-DIMENSIONAL MACHINING OF WORKPIECES

[75] Inventor: Walter Röder, Frankfurt, Fed. Rep. of Germany

[73] Assignee: Messer Griesheim GmbH, Frankfurt am Main, Fed. Rep. of Germany

[21] Appl. No.: 802,762

[22] Filed: Nov. 27, 1985

[30] Foreign Application Priority Data

Dec. 3, 1984 [DE] Fed. Rep. of Germany ....... 3444045
Feb. 1, 1985 [DE] Fed. Rep. of Germany ....... 3503401

[51] Int. Cl.$^4$ ............................................. B23K 26/08
[52] U.S. Cl. ...................... 219/121 LU; 219/121 LG; 219/121 LQ; 219/121 LV
[58] Field of Search ................. 219/121 LU, 121 LV, 219/121 LG, 121 LN, 121 LC, 121 LD, 121 LH, 121 LJ, 121 L, 121 LM, 121 LQ, 121 LR

[56] References Cited

U.S. PATENT DOCUMENTS

| 4,465,919 | 8/1984 | Röder | 219/121 LU X |
| 4,473,074 | 9/1984 | Vassiliadis | 219/121 L X |
| 4,539,462 | 9/1985 | Plankenhorn | 219/121 LV |
| 4,563,567 | 1/1986 | Geffroy et al. | 219/121 LV X |

Primary Examiner—C. L. Albritton
Attorney, Agent, or Firm—Toren, McGeady & Associates

[57] ABSTRACT

In a guidance device for a laser beam (17) repeatedly reflected at 45° mirrors at least six controllable movement axes (X, Y, Z, 4, 5, 7) are provided, of which two movement axes (5,7) are horizontal swiveling axes (11, 14), whereby the one swiveling axis (14) is assigned to the laser head (15). It can be achieved not only with two-dimensional cuts but also with three-dimensional cuts by appropriate adjustment of the swiveling angles ($\alpha,\beta$) at the swiveling axes (11, 14) and by a sufficient distance between the two swiveling axes (11, 14), that the point of intersection (27) on the workpiece (26) is always located vertically under the Z-movement axis, whereby the movement programming of the device is simplified. By adjustment of equal swiveling angles ($\alpha,\beta$) simplified circular arc cuts can be performed by rotation around only one movement axis (4) at horizontal workpieces. By arrangement of up to four swiveling axes according to additional embodiment versions of the guidance device simplified arc cuts can be realized also in non-horizontal workpieces, whereby at the same time an extraordinary extensive adaptability of the device to all cutting situations occurring with three-dimensional workpieces is achieved.

33 Claims, 30 Drawing Figures

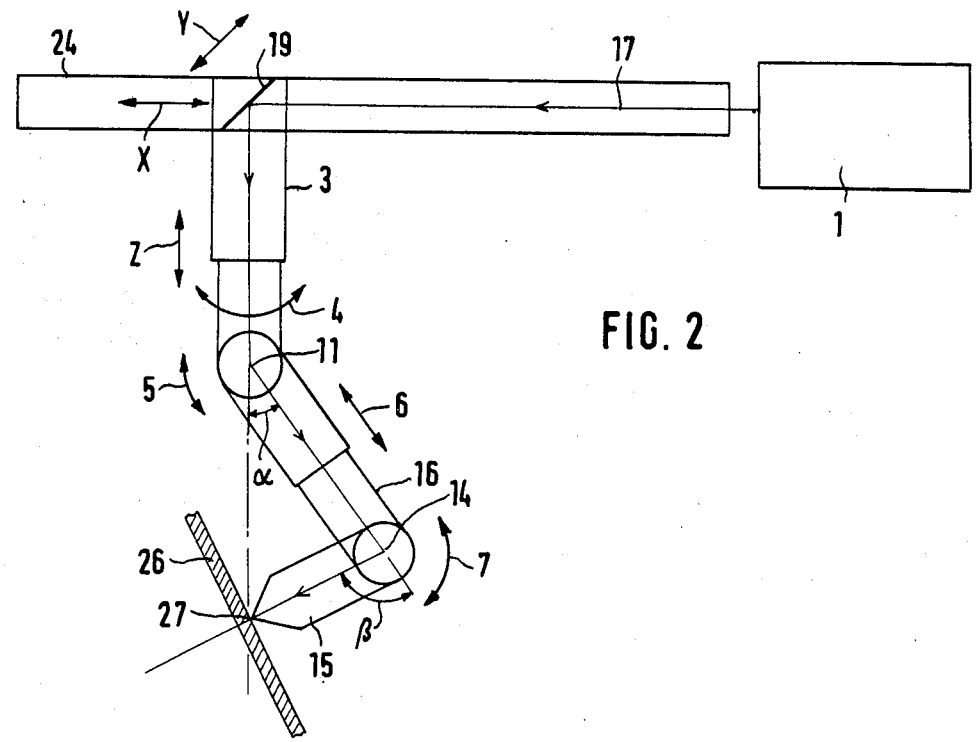
FIG. 2
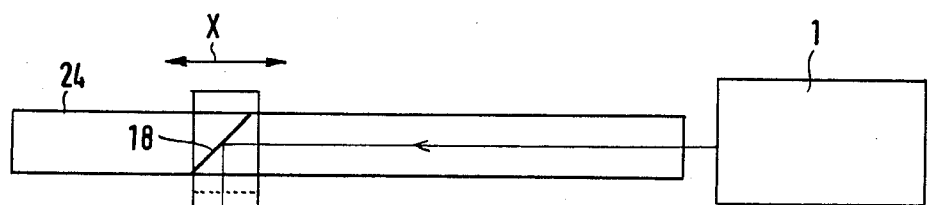
FIG. 3
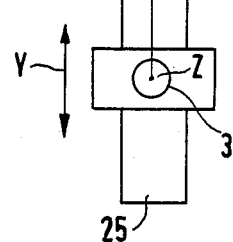

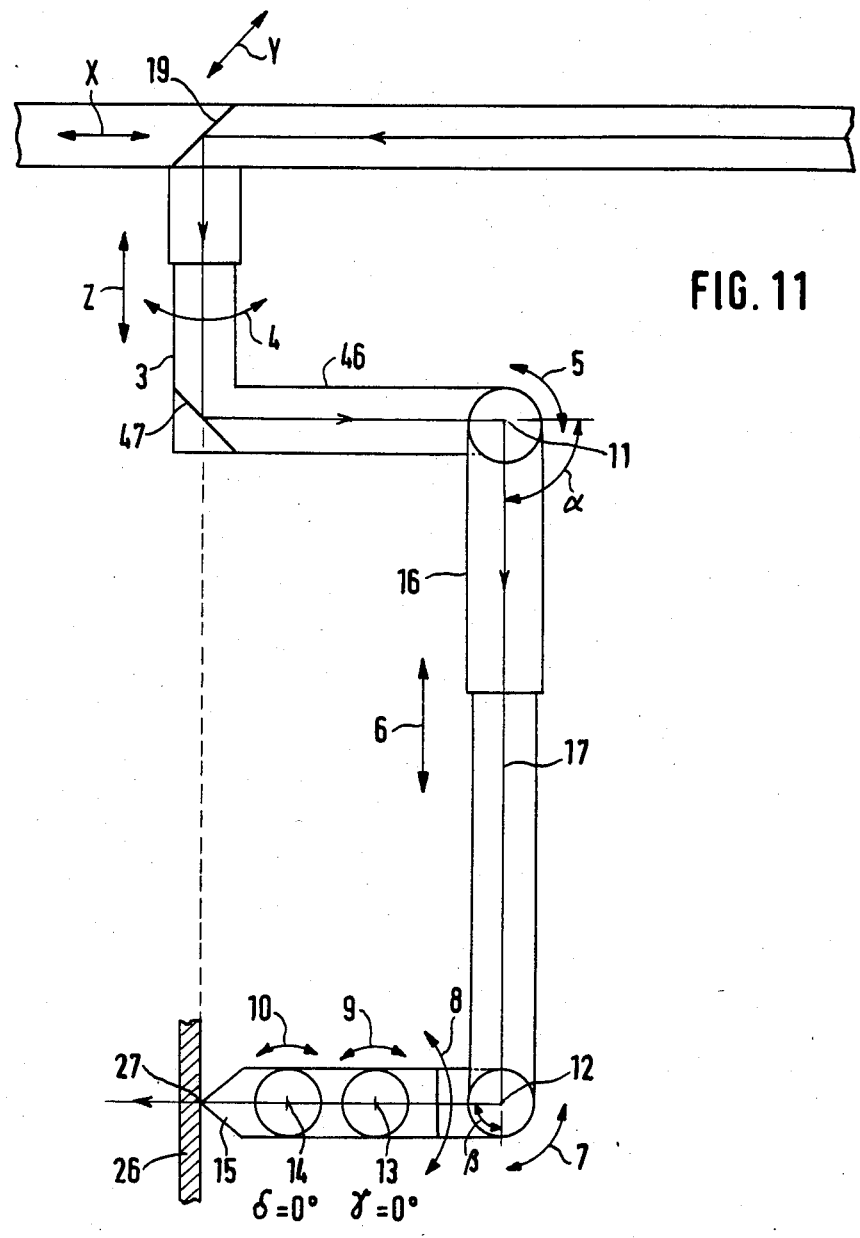

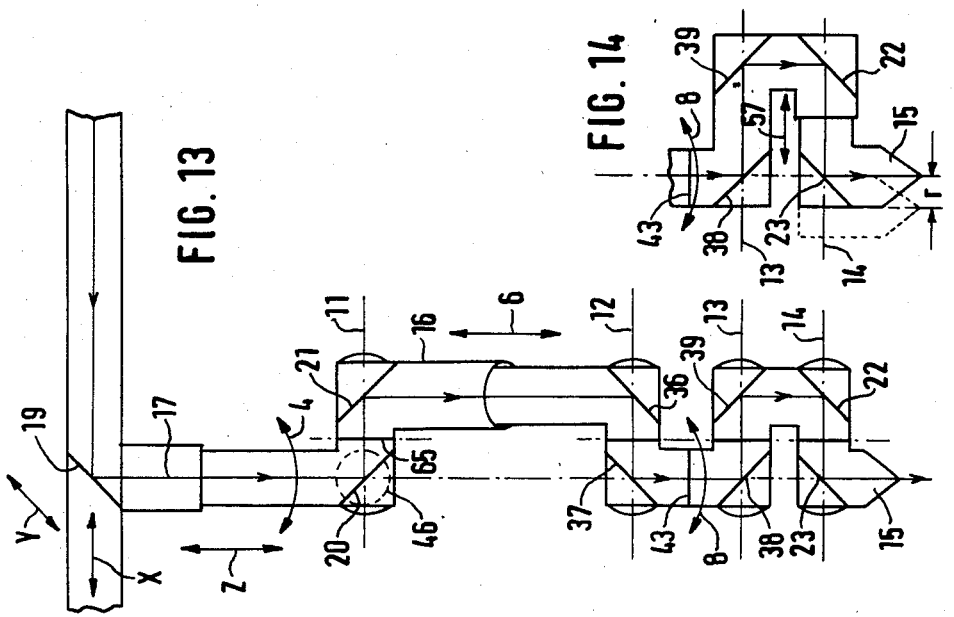
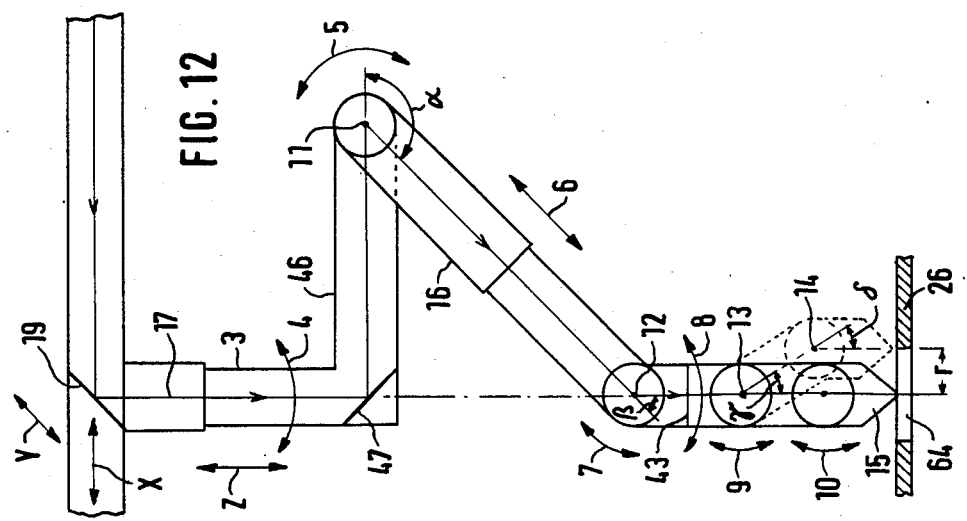

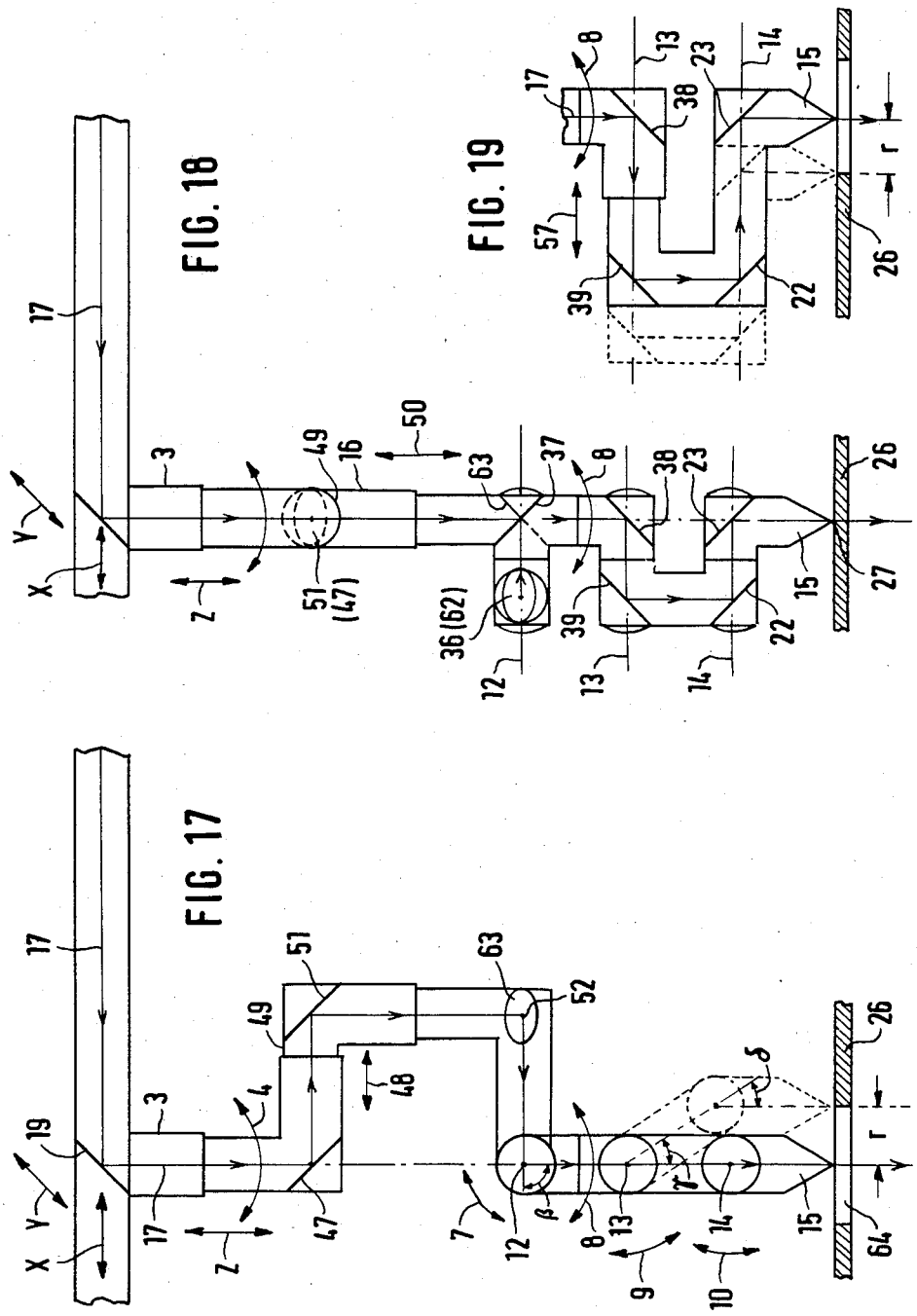

GUIDANCE DEVICE FOR A LASER BEAM FOR THREE-DIMENSIONAL MACHINING OF WORKPIECES

BACKGROUND OF THE INVENTION

The invention is directed to a guidance device for a laser beam repeatedly reflected at 45° mirrors for three-dimensional machining of workpieces, with five controlled axes of motion, of which the first and second axes of motion are the horizontal coordinate axes X and Y, the third and fourth axes of motion are realized coaxially in a rotatable telescopic installation which is variable as to length or such like and the fourth axis of motion is a horizontal swiveling axis, around which the laser head can be swiveled, whereby beginning with the third axis of motion a self-supporting design is provided. By self-supporting design a device is meant, in which the components causing the motion and the components guiding the laser beam are not designed separately from each other and then are connected with each other side by side, rather they are combined into a homogeneous design centrally guiding the laser beam.

Such guidance devices are utilized in laser cutting installations for material which can be cut by laser and which have a thickness cuttable by a laser and they permit, because of their five degrees of freedom as far as motion is concerned, the application of cuts and penetrations also in case of three-dimensional workpieces.

A known laser cutting device of this species (DE-PS No. 30 11 244) enables laser cuts of three-dimensional hollow and possibly flexible molded parts, which for this purpose are applied in a positively locking manner upon the support mold which complements the molded part.

If this known device has to perform cuts in workpiece areas arranged at an angle with respect to the horizontal, the laser head is adjusted at the desired angle with respect to the surface of the workpiece area concerned. In the interest of a uniform gap width of the cutting gaps with as high a feed velocity or cutting output as possible the laser head is appropriately adjusted perpendicularly to the workpiece surface. In any case hereby the laser head is pivoted around its horizontal swivelling axis, whereby the point of impact, meaning the point where the laser beam impinges upon the workpiece surface, lies outside of the vertical axis of the telescopic device. But also with a vertical adjustment of the laser head its central axis lies offset to the axis of the telescopic installation because of the required two-time beam reflection at the laser head swiveling axis, whereby also in the simplest vertical application case of the guidance device the point of impingement lies outside of the telescopic axis.

This location of the point of impingement complicates the preparation of a program for the computer controlled movement of the laser head and its guidance device to a considerable degree. Over and above that the guidance device is obliged, because it moves outside the workpiece, meaning externally of the cutting gap, to cover considerable travel distances and at contour transitions at the workpiece, for instance when the point of impingement passes out of a straight line into a curved movement path, it has to be moved with varying velocities, in order for the feed at the cutting point to remain as constant as possible in view of the desired uniform cutting gap width.

If penetrations in horizontal and/or non horizontal workpiece areas have to be cut with the known device, then the guidance device must be moved in the X- and Y movement areas in case of horizontally oriented penetrations and in case of non-horizontally oriented penetrations it must be additionally moved in the vertical Z-axis of motion, if a specific laser impingement angle upon the workpiece surface is to be observed.

Guidance devices of the type being discussed are suitable not only for laser cutting installations, but basically also for laser welding installation as well as installations in which material removal at workpiece surfaces is performed with the help of a laser beam, for instance for engraving or such like. Other areas of utilization are hardening, remelting and surface alloying. If in the following only laser cutting is discussed, the inventive device can, however, be utilized for all laser application cases, in which it is important to move laser head and workpiece precisely guided relative to each other.

SUMMARY OF THE INVENTION

The invention is based upon the task to make available a guidance device for a laser beam, which permits the machining of two- and three-dimensional workpieces with improved programmability of the movement sequence, short travel distances and while observing uniform cutting gaps. By "two-dimensional" workpieces, such workpieces are meant for the purpose of this application, which are designed to be essentially flat in a horizontal plane, thereby however can be a component of a three-dimensional workpiece in its entirety.

The given task is solved in the invention by six subordinate design versions deriving from the previously described species. In accordance with the first and simplest design version it is provided that an additional axis of motion designed as horizontal swiveling axis is provided parallel to the laser head swiveling axis, whose distance from the laser head swiveling axis is larger than the length of the laser head, whereby the laser beam reflection at the additional swiveling axis is provided in such a way that the central axis of the telescope device and the laser head are always located in a common vertical plane and that the swiveling angle at the additional swiveling axis and the laser head swiveling axis in accordance with the position of the workpiece surface to be machined are programmable and adjustable in such a coordinated manner, so that the point of impingement of the laser beam upon the workpiece surface is adjustable starting with a location upon the imagined extension of the central axis of the telescopic installation up to positions which are offset sidewise herefrom.

Hereby it is meant by the simplified expression "length of the laser head": the travel length between the center of the last reflecting mirror, meaning of the laser head swiveling axis coinciding with same, and the impingement point.

In the inventive device the central axes of the telescopic installation and the laser head are always located in a common plane, with the same length of the laser beam reflection travel at the swiveling axes, which is favorable for the movement control and—programming of the device and enables shorter travel paths. Because of the indicated spacing of the axes, the swiveling angle can be adjusted throughout a considerable angular range at the horizontal swiveling axes in order to reach all the workpiece surfaces to be machined, whereby always a perpendicular orientation of the laser beam with respect to the surface of the respective workpiece area is possible.

By "swiveling angle" within the framework of the present invention the angle between the distended or straightened position. and the central axis of the swivelable component of the guidance device contiguous to the respectively considered swiveling axis is meant, whereby the apex of the angle lies on the swiveling axis.

It is particularly advantageous for the programming and control of the device, if the swiveling angles at the horizontal control axes are programmed to be so coordinated witheach other for each phase of the cutting process, that the point of impingement of the laser beam upon the workpiece surface is located on the imagined extension of the central axis of the telescopic installation. By this measure it is achieved that the positions of the perpendicular central axis with respect to the horizontal coordinate axes X and Y always coincide with the position of the point of impingement upon the workpiece surface, independent from the respective angular position of the workpiece surface with respect to the horizontal. It is evident that hereby a considerable programming simplification for the automatic movement sequence is achieved, because the position of the central axis of the telescopic installation can be made the base for the programming in the horizontal coordinate axes X and Y. In the coordinated programming of the swiveling angles to start off with the swiveling angle of the laser head is fixed in accordance with the desired impingement angle of the laser beam upon the workpiece surface, thereby then the swiveling angle to be adjusted at the additional swiveling axis in a manner of speaking results in a complementary fashion. If two-dimensional cuts have to be performed with the inventive guidance device, meaning vertical cuts at flatly positioned horiontal workpiece areas, the swiveling angles at the swiveling axes then have the value zero. Positions of the point of impingement offset sidewise with respect to the central axis of the telescopic installation serve for the application of special cuts at the workpiece, for instance at difficult to accede points of the same.

For a simplified performance of circular arc-shaped cuts in two-dimensional workpieces, the inventive guidance device can advantageously be designed in such a way that the swiveling angles for the cutting of penetrations with at least partially circular arc-shaped extent of the cutting edge in horizontal workpiece areas are adjusted to be equally large at the laser head swiveling axis and a neighboring horizontal swiveling axis, and that for the fabrication of the circular arc-shaped cut the telescopic installation is driven in a rotating manner. In this identical swiveling angle arrangement which is also pre-programmable the central axis of the rotating telescopic installation and the central axis of the laser head run spaced from each other and parallel to each other, which spacing corresponds to the radius of the circular arc to be cut. Here also the two mentioned central axes are always located in a common vertical plane, which however rotates around the central axis of the telescopic installation together with same during the circular arc cutting. If straight line cuts follow the circular arc-shaped cutting edge, as this for instance is the case with elongated holes with parallel side edges and semicircular arc closure on both sides, then the explained identical swiveling angle adjustment is maintained after termination of each rotation through a semicircle and the guidance device is either moved upon the X-axis or the Y-axis in a straight line depending upon the location of the elongated hole. The imagined extension of the central axis of the telescopic installation hereby moves upon the longitudinal central axis of the elongated hole.

If circular-shaped penetrations have to be applied in horizontally located workpiece areas with the previously mentioned simplified adjustment of the guidance device, then the appropriately adjusted guidance device is rotated through 360° around the central axis of the telescopic installation, whereby no movements occur at all other axes of motion.

The guidance device can advantageously be designed in such a way that with arrangement of an additional horizontal swiveling axis parallel to the laser head swiveling axis the laser beam is guided in between the two swiveling axes with formation of an additional axis of motion, through an additional telescopic device controllable to be changeable in length. Through this an additional degree of freedom of motion is gained whereby the three-dimensional utilization area of the guidance device is increased further.

It is provided, in a second subordinate design of the guidance device corresponding to the previously indicated species, that three additional axes of motion designed as horizontal swiveling axes are provided parallel to the laser head swiveling axis, in which the distance between the first and the second of the swiveling axes downstream of the telescopic installation is greater than the sum of the distances between the first and the second swiveling axes and between the first swiveling axis and the laser head axis increased by the length of the laser head, whereby the laser beam reflection at all swiveling axes is provided in such a way that the central axes of the telescopic installation and the laser head are aligned with each other, when the swiveling angle at all swiveling axes has the value zero, and that between the second and the third swiveling axis a third rotational axis controllable through 360° is provided.

This subordinate design version of the guidance device enables all work or adjustments, as they were previously described in connection with the first design version, if the swiveling angles at the third swiveling axis (counted from the telescopic installation) and at the laser head swiveling axis are adjusted to the value of zero and merely the swiveling angles at the first and second swiveling axis are being program controlled. Additionally, this subordinate design version opens up the possibility to cut penetrations with circular arc-shaped cutting edge extent analogously to the already described manner also in workpiece areas arranged obliquely with respect to the horizontal.

This occurs in that the swiveling angles at the first and second swiveling axes are adjusted in such a way for the cutting of penetrations with at least partially circular arc-shaped extent of the cutting edge in non-horizontal workpiece areas, so that the second rotational axis is aligned perpendicularly to the workpiece surface, while the swiveling angles at the third swiveling axis and the laser head swiveling axis are arranged in accordance with a sectional radius in such a way that the second rotational axis and the central axis of the laser head run parallel, and that the laser head is rotatably driven around a second rotational axis. In cutting holes in accordance with the guidance device designed in such a way the X-axis, the Y-axis and the Z-axis and all swiveling axes are motionless.

Also in case of the second subordinate design of the guidance device the laser beam between the first swiveling axis and the second swiveling axis can be guided between these two swiveling axes through an additional telescopic installation controllable as to length change with formation of an additional movement axis. Hereby again a compensation in height in vertical direction can occur, with which can become necessary through the different angular adjustment of the laser head, meaning the different swiveling angles at the laser head swiveling axis, without availing oneself of a length change in Z-direction at the vertical telescopic installation.

According to a third subordinate design version of the invention it is provided that an additional axis of motion designed as a horizontal swiveling axis is provided parallel to the swiveling axis for the laser head, that between the swiveling axis for the laser head and the laser head two additional horizontal laser reflection axes parallel to the two swiveling axes are provided, of which the one is designed as a stationary axis and the other as a telescopic axis, that between the swiveling axis for the laser head and the neighboring laser beam reflection axis a second rotational axis controllable through 360° is provided, that the distance between the two swiveling axes is larger than the sum of the distances between the swiveling axis for the laser head and the laser beam reflection axis adjacent to the laser head increased by the length of the laser head, and that the laser beam reflection at the pivoting axes and the two additional laser beam reflection axes is provided in such a way that the central axes of the telescopic installation and the laser head are aligned with each other, if the swiveling angle at the two swiveling axes has the value of zero and the telescopic axis is not changed in its length.

Other advantageous features concerning this design version result from the claims. With the help of the three subordinate embodiment versions of the guidance device discussed up to now, it can be achieved that the point of impingement of the laser beam upon the workpiece surface is located vertically below the central axis of the previously mentioned telescopic installation for the purpose of simplying programmability of the movement sequence. At least, however, it is achieved that the central axes of the said telescopic installation and the laser head are located in a common vertical plane, which is also favorable for the motion control and programmability of the device and enables shorter travel distances. This applies for laser cuts in two-dimensional as well as those in three-dimensional workpiece areas. Apart from that embodiment versions of the device were proposed, with the help of which the application of circular arc-shaped laser beams in horizontal and non-horizontal workpiece areas is made possible in a simplified manner, without any motion of the device at the coordinate axes X, Y, Z. By this means programmed controlled penetrations with at least partially circular arc-shaped extent of the cutting edges can be applied in all workpiece areas.

Starting with the previously described species, it is provided in the fourthembodiment version that at the lower end of the telescopic installation a horizontal conduit tube is attached, in which the laser beam is reflected at a 45° mirror, that an additional movement axis designed as a horizontal swiveling axis is provided parallel to the laser head swiveling axis at the free end of the conduit tube, that between the laser head swiveling axis and the laser head two additional horizontal laser beam reflecting axes parallel to the two swiveling axes are provided, which either both are designed as horizontal swiveling axes, or of which the one is designed as a stationary axis and the other as a movement axis changeable in its length, that between the laser head swiveling axis and the adjacent laser beam reflection axis a second rotational axis controllable through 360° is provided, and that the laser beam reflection at the swiveling axes and the two additional laser beam reflection axes is provided in such a way that the central axes of the telescopic installation and of the laser head are always located in a common vertical plane, if the two additional laser beam reflection axes are not adjusted for cutting of circular arc-shaped penetrations.

With the help of the guidance device according to the first embodiment version, vertical or even undercut workpieces acceptable with difficulty or not at all can be reached advantageously with the laser head, whereby straight line cuts in all directions as well as simplified circular arc cuts with programmed cut guidance are possible.

Further advantageous or suitable embodiments of the guidance device according to the fourth embodiment version result from the claims.

According to a fifth subordinate embodiment version it is provided starting with the previously stated guidance device, that at the lower end of the telescopic installation a second controlled and changeable in length telescopic installation is connected with formation of an additional horizontal movement axis, in which telescopic installation the laser beam is reflected at a 45° mirror and at which a third telescopic installation changeable in length is connected with formation of an additional vertical movement axis into which the laser beam is reflected at a 45° mirror, that at the lower end of the third telescopic installation a stationary laser beam reflection axis is provided parallel to the laser head swiveling axis, by which the laser beam is reflected towards the laser head swiveling axis, that between the laser head swiveling axis and the laser head two additional horizontal laser beam reflection axes parallel to the laser head swiveling axis are provided, which either are designed both as horizontal swiveling axes, or of which one is designed as stationary axis and the other as a movement axis changeable in length, that between the laser head swiveling axis and the adjacent laser beam reflection axis a second rotational axis controllable through 360° is provided, and that the laser beam reflection at the laser head swiveling axis and the three laser head reflection axes is provided in such a way that the central axes of the telescopic installation and of the laser head are always located in a common vertical plane, if the two additional laser beam reflection axes are not adjusted for cutting of circular arc-shaped penetrations.

With this fifth subordinate embodiment version of the guidance device cuts in otherwise difficult to access or not at all accessible workpiece areas can be undertaken also as has already been mentioned with the fourth embodiment version, whereby in this fifth embodiment version an even larger adaptability to the shape and position in space of the workpiece surfaces to be machined exists because of additional degrees of freedom of motion of the guidance device. Advantageous or suitable embodiments of the fifth subordinate embodiment version result from the claims.

According to a sixth simplified embodiment version of the guidance device, which again is derived from previously stated species, it is provided that at the lower end of the telescopic installation a horizontal, fixed laser beam reflection axis is connected parallel to the laser head swiveling axis, by means of which the laser beam is reflected towards the laser head swiveling axis, that between the laser head swiveling axis and the laser head two additional horizontal laser beam reflection axes parallel to the laser head swiveling axis are provided, which either both are designed as horizontal swiveling axes, or of which the one is designed as a stationary axis and the other as a moving axis changeable in length, that between the laser head swiveling axisand the adjacent laser beam reflection axis a second rotational axis controllable through 360° is provided, and that the laser beam reflection at the fixed laser beam reflection axis, the laser head swiveling axis and the two additional laser beam reflection axes is provided in such a manner that the central axes of the telescopic installation and of the laser head are always located in a common vertical plane, if the two additional laser beam reflection axes are not adjusted for cutting circular arc-shaped penetrations.

This sixth subordinate embodiment version of the guidance device also affords in spite of its comparatively simple structure the basic possibilities of the other subordinate embodiment versions.

An advantageous further embodiment of the sixth embodiment version of the guidance device results from the claims.

In the fourth to sixth embodiment versions the arrangements can advantageously be provided in such a form that the rotational axis provided between the laser head swiveling axis and the adjacent laser beam reflection axis is designed at the same time as telescopic installation and with this at the same time as movement axis changeable in length. Through this the adaptability of the device is even further increased.

The claims make possible advantageously in all subordinate embodiment versions of the guidance device simplified laser beam guidance within the device by elimination of laser beam reflections not required for the respective cut progression, whereby the beam travel is shortened and the reflecting mirrors impacted by the laser beam are conserved.

At least one claim is directed to an advantageous application of the guidance device for all subordinate embodiment versions for the production of circular arc-shaped conically progressing edges of cuts, as they can be desirable for the application of countersunk holes or the deburring of vertical edges of cuts at circular arc-shaped cutouts.

BRIEF DESCRIPTION OF THE DRAWING

Further details of the invention are explained in the following with particularity with the help of a schematic drawing depicting the embodment examples. It is shown therein on:

FIG. 11 a side view of the fourth embodiment version of the device with four swiveling axes and a fixed conduit tube attached at the lower end of the telescopic installation, adjusted for a laser cut at a vertical area of the workpiece, FIG. 12 a further side view of the device according to FIG. 11, adjusted for a laser cut in a horizontal area of the workpiece, FIG. 13 the front view of the device in the adjustment position according to FIG. 12, FIG. 14 the truncated front view similar to FIG. 13, however with a different layout of the two laser beam reflection axes adjacent to the laser head, FIG. 15 a side view of the fifth embodiment version of the guidance device with a horizontal telescopic installation connected to the lower end of the telescopic installation, a vertical telescopic installation contiguous thereto, a fixed laser beam reflection axis and three swiveling axes parallel thereto, adjusted for a laser cut in a vertical area of the workpiece, FIG. 16 the plan view of the lower area of the guidance device according to the viewing direction of arrow XVI in FIG. 15, FIG. 17 an additional side view of the guidance device according to FIG. 15, adjusted for a laser cut in a horizontal area of the workpiece, FIG. 18 the front view of the device according to FIG. 17, FIG. 19 a truncated front view similar to the FIG. 18 with another embodiment of the two laser beam reflection axes adjacent to the laser head, FIG. 20, the front view of a sixth embodiment version of the guidance device, with a fixed laser beam reflection axis at the lower end of the telescopic installation and three swiveling axes presented in vertical distended position for the laser cut in horizontal areas of a workpiece, FIG. 21 a side view of the device according to FIG. 20, adjusted for a laser cut in an (viewed from above) undercut area of a workpiece, FIG. 22 the plan view upon the lower area of the device in viewing direction of the arrow XXII in FIG. 21, FIGS. 23 to 25 plan views similar to FIG. 22, which include modifications of the device.

DETAILED DESCRIPTION OF THE PREFERRED EMBODIMENT

Figure 1:
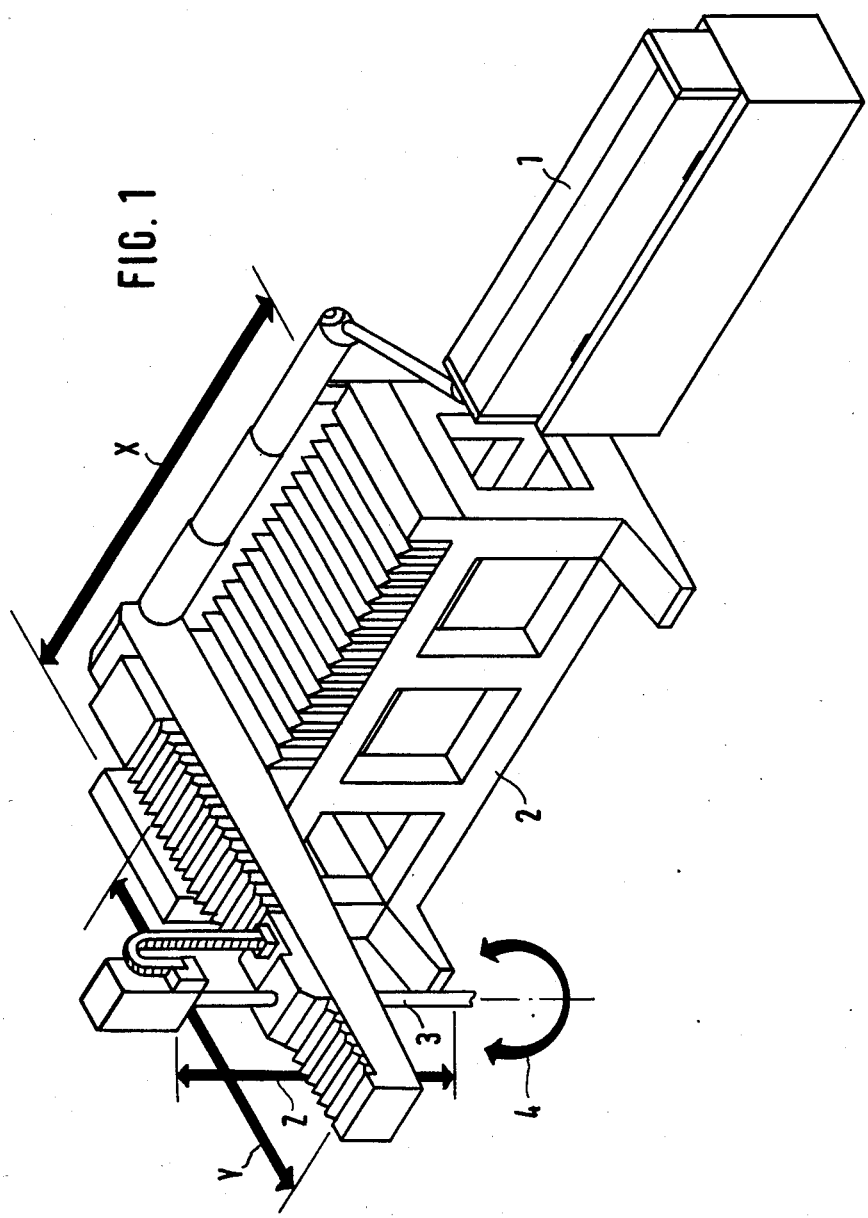
FIG. 1 an overall view of a laser cutting installation in perspective.

FIG. 1 illustrates the overall arrangement of a laser cutting installation, however, without a table for receiving the workpiece to be machined. Apart from that the inventive device is not depicted. The laser beam generated in the $CO_2$-laser unit 1 is guided after appropriate reflection parallel to the X-movement axis of the illustrated coordinate guidance machine and is reflected in direction of the Y-movement axis and finally in the direction of the Z-movement axis. The guidance elementsfor the X-, Y- and Z-movement axes are fastened at the machine stand 2 and covered with bellows in the precise embodiment usual with coordinate guidance machines. Arrows X, Y and Z drawn with thick lines designate the associated movement axes, namely the first, second and third movement axes, and indicate the possible travel length. The annular arrow designated with the reference number 4 symbolizes the fourth movement axis, which is realized at the telescopic installation 3 rotatable through 360° around its central axis, which is presented in FIG. 1 truncated at its lower end.

The movement axes X, Y and possibly also Z could alternately also be provided at the not shown machine table, so that the workpiece can be moved on the table in these axes with respect to the guidance device which remains to be still described. In this case the controlled movement axes would be divided between the table and the guidance device.

Light laser units can also be attached to the coordinate guidance machine in such a way, that it can move together with said machine in the X- and Y-direction, so that only one reflection of the laser beam at a 45° angle into the Z-axis meaning into the telescopic installation 3 is required.

Figure 4:
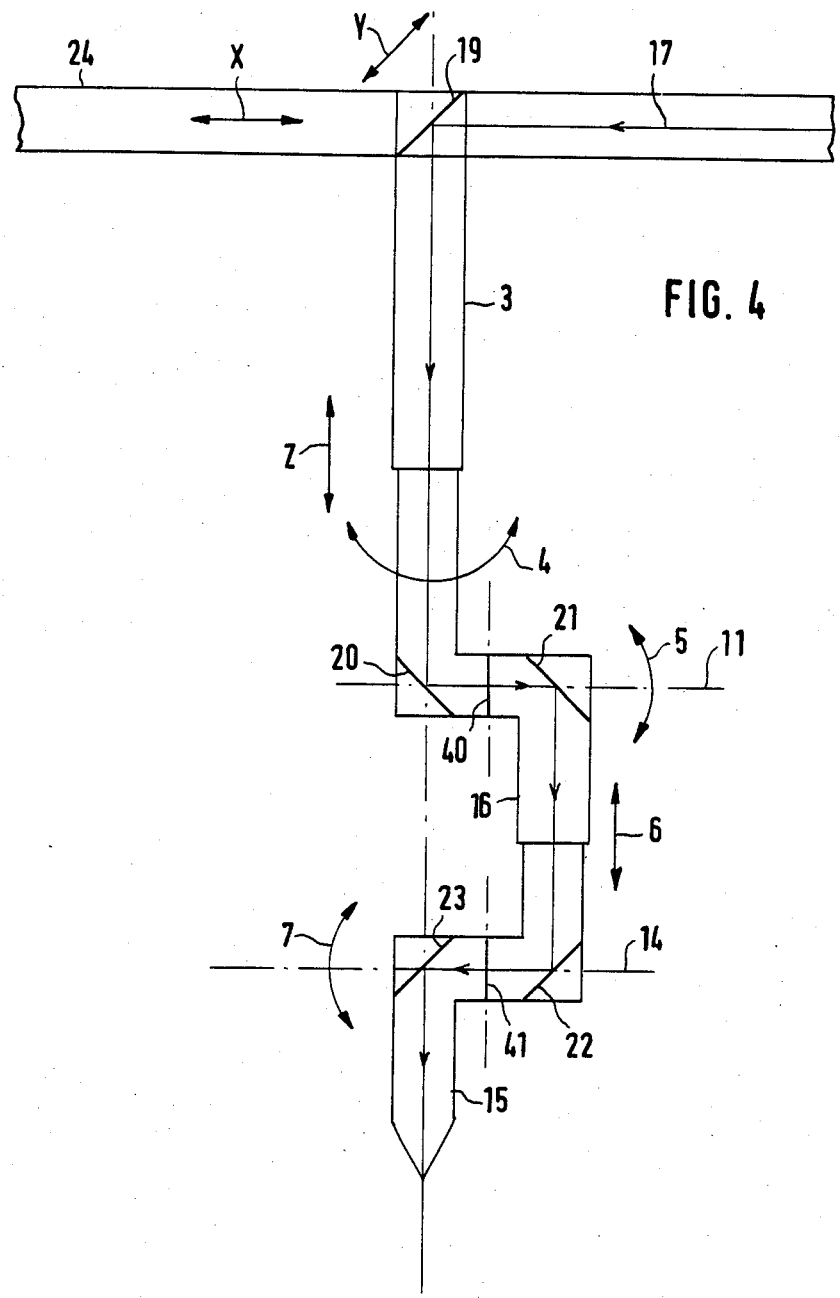

For an explanation of a first embodiment example of the inventive guidance device to start off with the FIGS. 2-4 are being referred to. As can be seen thereon in view of the there depicted arrows X, Y, Z, 4, 5, 6 and 7, seven separately controlled movement axes are provided. The arrow 4 refers to the axis of rotation of the telescopic installation 3, which is rotatable around this axis through 360°. The arrows 5 and 7 designate the axes of rotation, which are constituted by two swiveling axes 11 and 14. The swiveling axis 14 is the swiveling axis of the laser head 15, which includes the usual focusing arrangement for a laser beam, which is not depicted here.

The arrow 6 represents an additional axis of movement which is not absolutely required in all embodiment versions, which is made possible by an additional telescopic installation 16 which is controlled to be changeable in length. This telescopic installation 16 permits an adjustment of the distance between the swiveling axis 11 and the laser head swiveling axis 14.

The laser beam 17 emanating from the laser unit 1 (FIGS. 2, 3) and repeatedly reflected at 45° mirrors is represented by a series of arrows. As is evident the central axis of the laser beam coincides with the central axes of the components of the guidance device. The reflection of the laser beam 17 from the X-axis into the Y-axis occurs at the reflecting mirror 18 (FIG. 3). The corresponding reflection from the Y-axis into the Z-axis is taken care of by the reflecting mirror 19 (FIG. 2). As is clarified in FIG. 4, two reflecting mirrors 20 and 21 are located on the swiveling axis 11, of which the mirror 20 reflects the laser beam 17 into the swiveling axis 11, while the mirror 21 accomplishes the reflection to the laser head swiveling axis 14. On this said axis there are located two additional reflecting mirrors 22 and 23, of which the mirror 22 reflects the laser beam into the swiveling axis 14, while the mirror 23 accomplishes the reflection into the laser head 15.

The straight line guidances of the X- and Y- axes are designated in the FIGS. 2 and 3 by reference numbers 24 and 25. As is made clear in FIG. 2, the reflection travels of the laser beam between the reflecting mirror pairs 20, 21 and 22, on the swiveling axes 11 or 14 are equally long, whereby in the distended position of the guidance device depicted in FIG. 4 the central axes of the telescopic installation 3 and the laser head 15 are aligned with each other without any offset. In this distended position the point of impingement of the laser beam upon the workpiece surface is evidently located on the imagined extension of the central axis of the telescopic installation 3. This distended position is utilized in two-dimensional cuts.

Figure 2A:
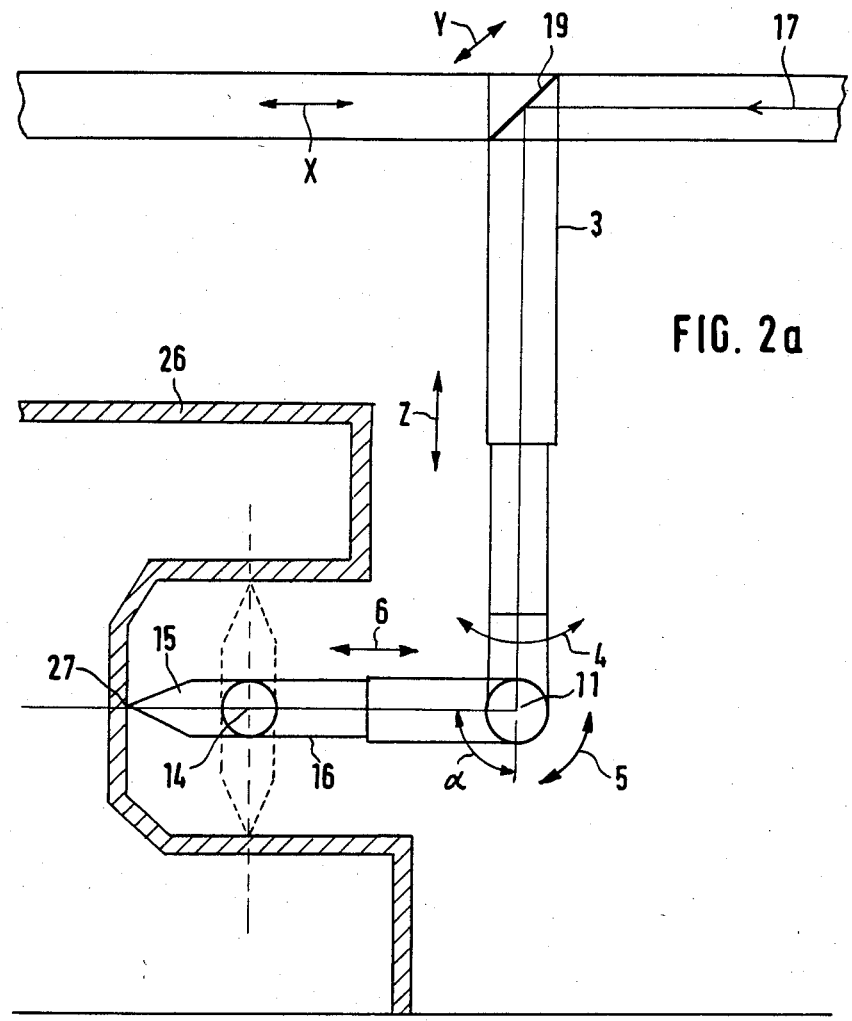
FIG. 2 the side view of a guidance device in accordance to the first embodiment version equipped with two swiveling axes, FIG. 2a a further side view of the device with adjustment of the swiveling angles for cutting in workpiece areas with difficult access, FIG. 3 a plan view upon the device according to FIG. 2 with swiveling angles at the two swiveling axes adjusted to the value zero, FIG. 4 the front view of the guidance device in accordance to the FIGS. 2 and 3, with swiveling angles of the two swiveling axes again adjusted to the value zero, FIG. 5 a further side view of the guidance device according to FIGS. 2–4, however with adjustment of the pivoting angles for cutting of a penetration in horizontal position of the workpiece, FIG. 6 a side view of the second subordinate embodiment version with an adjustment of the swiveling angles at the four swiveling axes for production of cuts at non-horizontal workpiece areas, FIG. 7 a side view similar to the FIG. 6, however with adjustment of the swiveling angles at the four swiveling axes for cutting of circular arc cuts in non-horizontal workpiece areas, FIG. 8 a front view of the embodiment version of the guidance device according to the FIGS. 6 and 7 with zero value adjustment of all swiveling angles at all swiveling axes, FIG. 9 a front view similar to the FIG. 8 but in truncated form of the third subordinate embodiment version in a first embodiment variant, and FIG. 10 a truncated front view of the third subordinate embodiment version similar to FIG. 9 in a second embodiment variant.

In the position of the parts of the guidance device depicted in FIG. 2, the additional telescopic installation 16 is swiveled around the swiveling axis 11 through the swiveling angle $\alpha$, while the laser head 15 is swiveled around the laser head swiveling axis 14 through the angle $\beta$. The angles $\alpha$ and $\beta$ as well as possibly the length of the additional telescopic installation 16 are so adjusted by the program control in coordination with the inclined position of the surface of the workpiece 26 drawn-in in truncated form, that on the one hand the central axis of the laser head 15 runs perpendicularly with respect to the workpiece 26 and on the other hand the imagined extension of the central axis of the telescopic installation 3 passes through the point of impingement 27 on the surface of the workpiece 26, whereby the central axis of the laser head 15 and the mentioned imagined extension meet in the point of impingement 27. Horizontal cuts in the workpiece 26 performed in this position of the guidance device require a movement of the guidance device only in the Y-axis, whereby the position of the Z-axis represents the location of the point of impingement 27, whereby the program preparation for cuts of this type is very considerably simplified. In the case of cuts in vertical direction the movement control occurs by means of combined movement at the axes of movement X and Z. However, also any type of three-dimensional cut guidance is possible, whereby the location of the intersection of the central axis of the laser head 15 and the extension of the vertical central axis of the telescopic installation is always observed in the point of impingement 27 in a program controlled manner by means of appropriate control of the axes X, Y and Z on the one hand and the movement axes 5 and 7 as well as possibly 6 on the other hand. Even if in certain cutting situations the point of impingement 27 does no longer lie on the imagined extension of the central axis of the telescopic installation 3, the central axes of the telescopic intallation 3 and of the laser head 15 are, however, always located in a common vertical plane, as is without further ado evident from the collective observation of FIGS. 2 and 4, which also enables a simplification of the program control. Such a cutting situation is depicted in FIG. 2a. Hereby the laser head 15 is shown with constant swiveling angle $\alpha = 90°$ in three different positions with $\beta = 0°$ (solid lines) and $\beta = 90°$ (dotted lines), whereby three surface areas of the workpiece 26, access to which is difficult, are reached.

Figure 5:
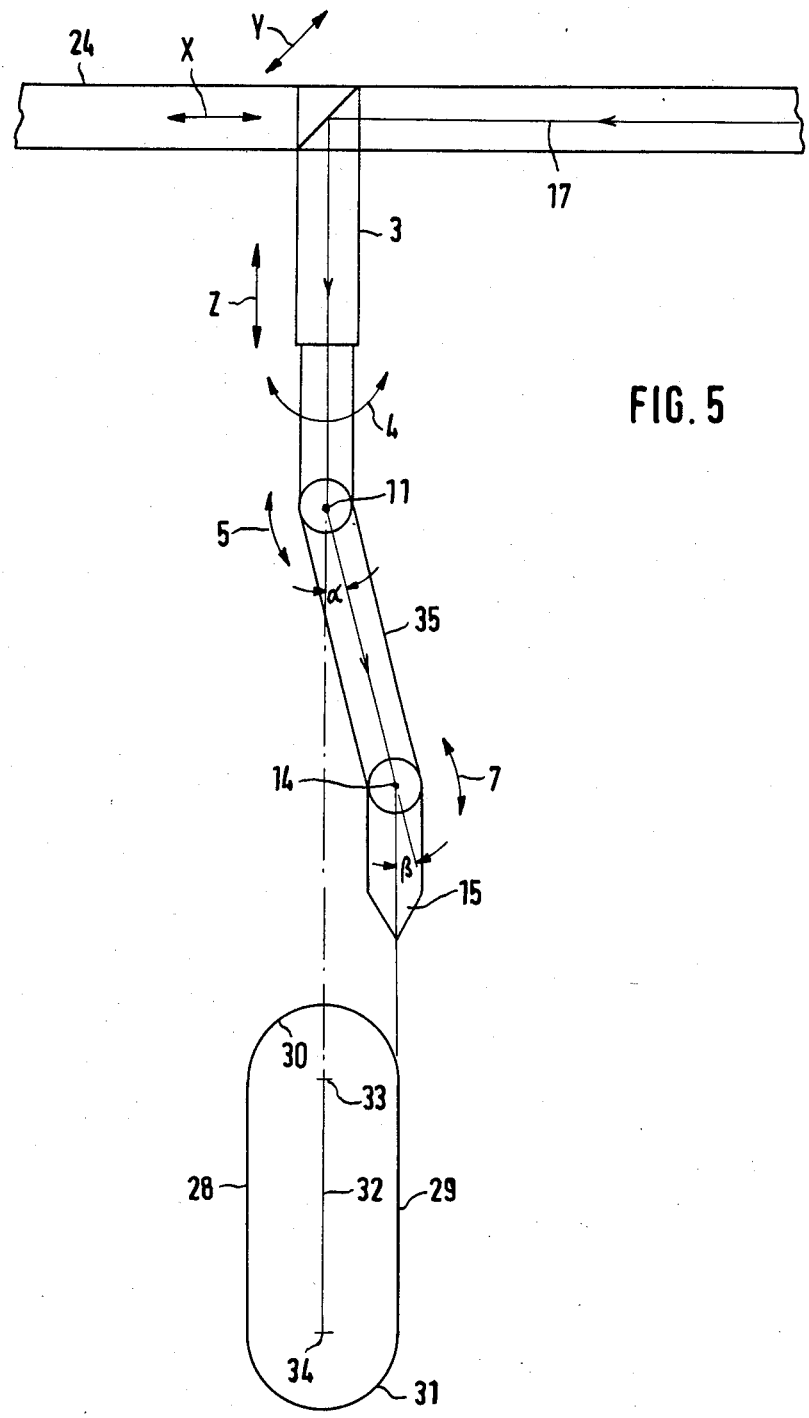

The execution of a simplified penetration cut in a horizontal position of the workpiece surface with the help of the guidance device depicted in the FIGS. 2-4 is shown in FIG. 5. The penetration to be cut is shown merely in its contour line and is depicted for purpose of clarification swiveled out through 90° from its rear horizontal position into the plane of the drawing. In this case one deals with an elongated hole with two parallel cutting edges 28, 29 and two closing semicircular cutting edges 30, 31. Swiveling angles $\alpha$ and $\beta$ at the swiveling axes 11 or 14 are adjusted in a program-controlled manner to equal magnitude in accordance with the desired radius r of the semicircular cutouts, whereby the central axes of the telescopic installation 3 and the laser head 15 run parallel to each other offset by the radius r. The movement of the guidance device occurs for the production of the elongated hole shown only in two axes, namely in the Y-movement axis and in the rotational movement axis 4. First of all the central axis of the telescopic installation 3 is adjusted in a program-controlled manner to one of the centers of the circles 33 or 34, after which by a rotation at the movement axis 4 through 180° a semicircle 30 or 31 is cut in. After this the guidance device is moved in direction of the Y-movement axis, until the other center of the circle lies vertically below the central axis of the telescopic installation 3. The distance between the centers of the circles 33 and 34 indicatesthe travel distance of the central axis of the telescopic installation 3. On determination of the straight line movement the still missing semicircle is cut by means of an additional 180° rotation at the movement axis 4. In the case of circular cuts neither movements in the X-axis nor in the Y-movement axis are required, here there occurs exclusively a rotation around the fourth movement axis. It is evident that thereby a considerable programming simplification for movement progression of the guidance device is achieved.

In the guidance device depicted in FIG. 5 no additional telescopic installation 16 is provided between the swiveling axes 11 and 14, rather a tube-shaped connecting piece 35. For the rest of it, as the drawings show, the laser beam 17 is guided throughout in the inside of the guidance device built up from tube-shaped parts. The actuation motors for the actuation movement at the movement axes attached at the tube-shaped parts, which are program-controllable independently of each other, are not drawn-in in all illustrations. They correspond to the state of the art as far as design, manner of attachment and effect is concerned.

Figure 6:
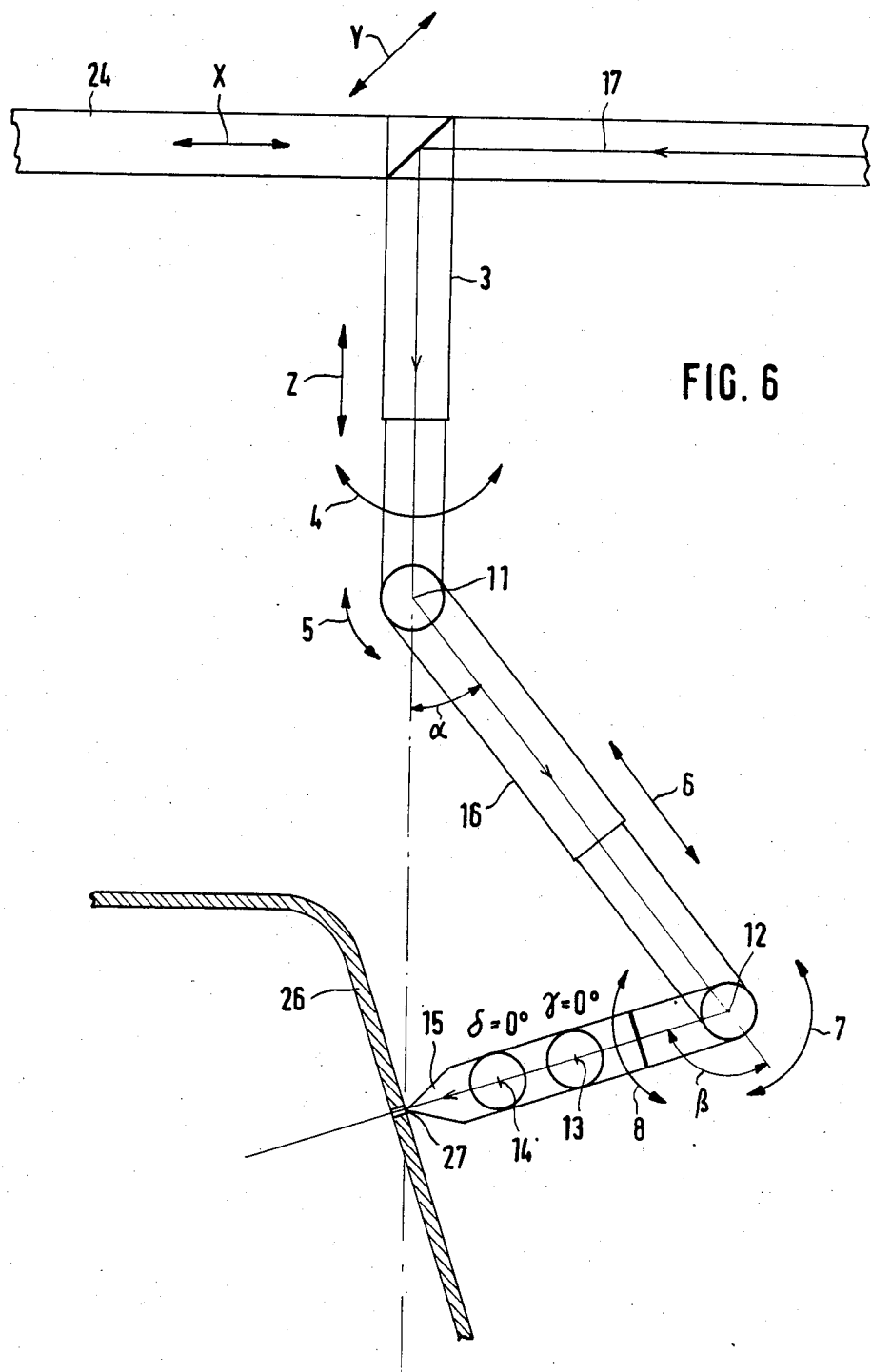
Figure 7:
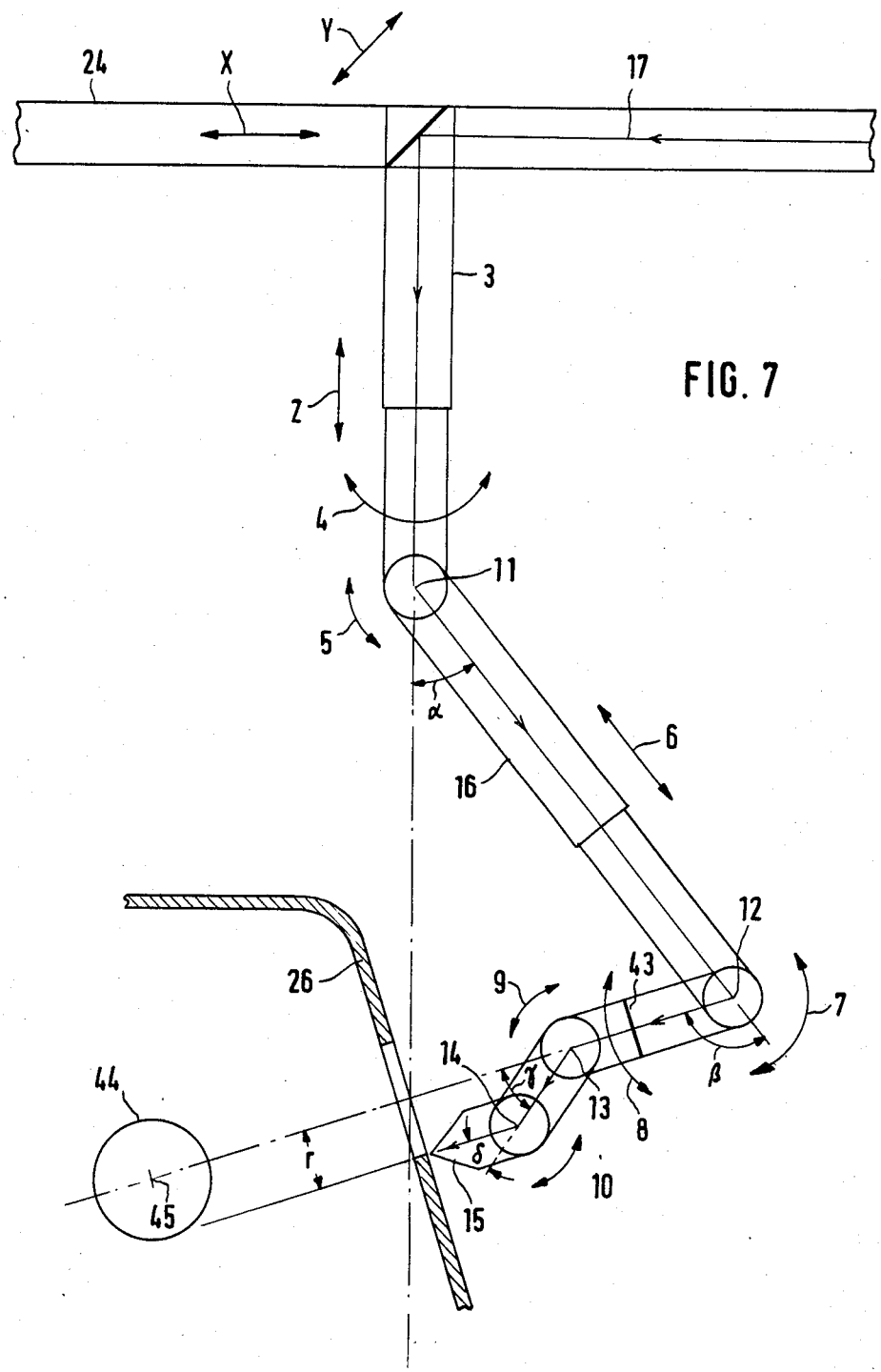
Figure 8:
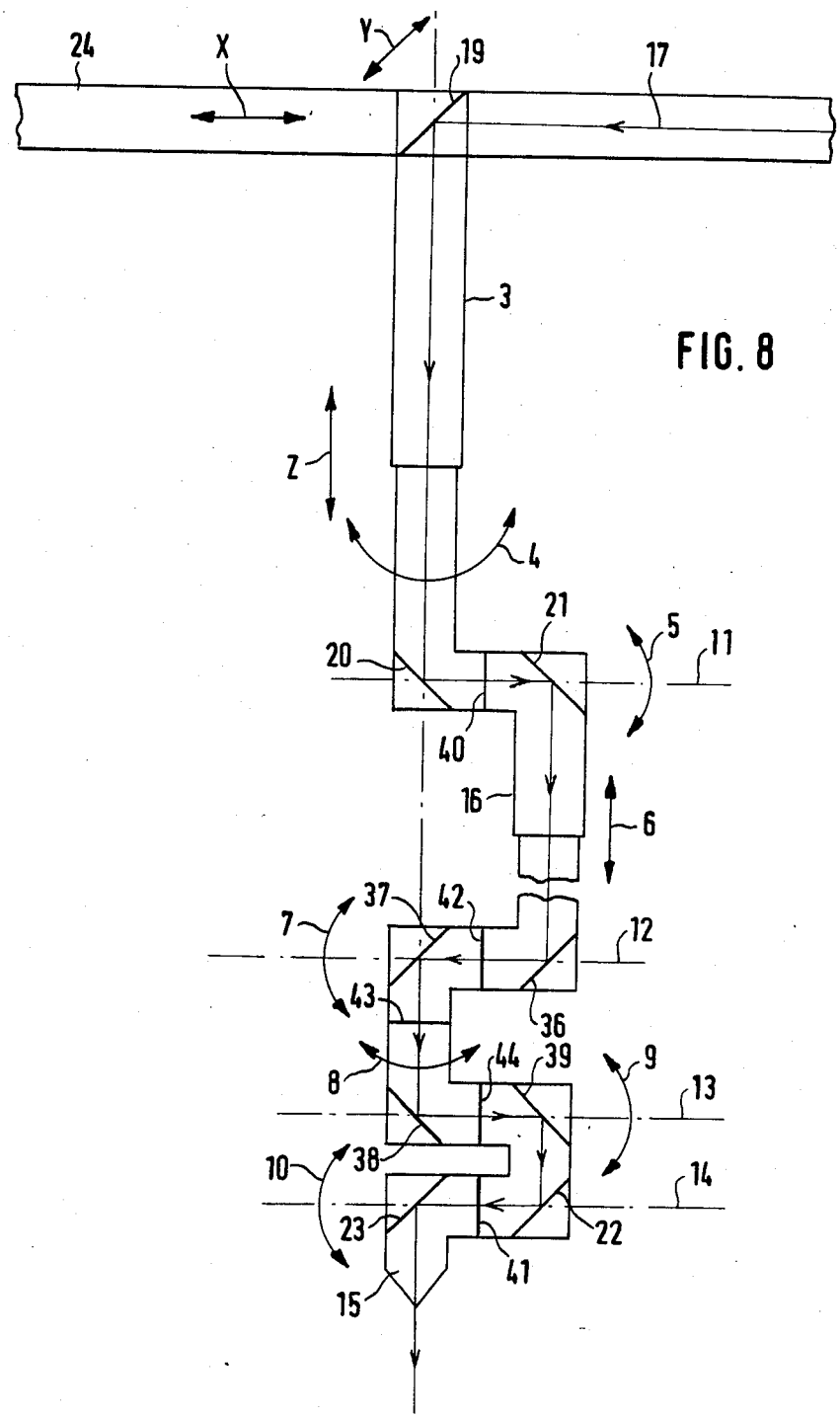

The second embodiment version of the inventive guidance device depicted in FIGS. 6-8 comprises apart from the swiveling axis 14 for the laser head 15 three additional swiveling axes 11, 12 and 13. Hereby as compared with the embodiment version according to FIGS. 2-5 the swiveling axes 12 and 13 are additionally provided. All swiveling axes 11-14 are designed identically, whereby the required reflections of the laser beam 17 at the swiveling axes 12 and 13 occur also by 45° reflecting mirrors 36, 37 or 38, 39 arranged in pairs. Between the swiveling axes 11 and 13 there is again located an additional telescopic installation 16, which represents a movement axis 6. Overall the guidance device depicted in distended position in FIG. 8 has ten movement axes, which are indicated by arrows X, Y, Z, 4, 5, 6, 7, 8, 9 and 10. The movement axis designated by the arrow 8 is an axis of rotation, which enables rotation through 360°. For the rest of it the transverse lines depicted in the FIGS. 4-8 with the references numbers 40-44 designate swiveling- or rotational planes of the parts of the device, at which the relative movement of respectively adjacent device parts occur.

As the distended position of the guidance device shown in FIG. 8 illustrates, the central axes of the telescopic intallation 3 and the laser head 15 are again aligned in this position without offset. Vertical cuts at workpiece surfaces located in horizontal planes are executed in this position of the device by control at the movement axes X and Y.

The ten movement axes X, Y, Z, 4, 5, 6, 7, 8, 9 and 10 discernible from FIG. 8 make possible the simplified application of penetration cuts at the workpiece surfaces (FIG. 7) positioned in inclined manner as against the horizontal. In case of straight line cuts in such obliquely positioned workpiece surfaces (FIG. 6) the guidance device starting with a distended position according to FIG. 8, is merely adjusted at the swiveling axes 11 and 14 concerning the angles $\alpha$ and $\beta$, as this was described in reference to FIG. 2. The movement axes 8, 9 and 10 are not imparted an adjustment change as against the distended position shown in FIG. 8. As is evident the central axis of the laser head 15 intersects again the imagined extension of the central axis of the telescopic installation 3 at the point of intersection 27 on the surface of the workpiece 26, whereby the point of intersection lies again vertically below the Z-movement axis. FIG. 6 shows also that the additional telescopic installation 16 is extended to a distance between the swiveling axes 11 and 14, which is larger than the distance between the swiveling axis 14 and the point of intersection 27. The circumstances are similar also in case of the FIG. 7 which remains to be explained.

In order to effect a circularly shaped cut 44 at the surface of a workpiece 26 inclined as against the horizontal, the angles $\alpha$ and $\beta$ at the swiveling axes 11 or 12 are adjusted in such a manner that the rotational movement axis 8 is aligned perpendicularly to the surface of the workpiece 26. Furthermore, starting with the position shown in FIG. 6 equally large swiveling angles $\gamma$ and $\delta$ are adjusted at the swiveling axes 13 and 14 in accordance with the desired size of the radius r of the circularly-shaped cut 44. For reasons of clarity the circularly-shaped cuts 44 are presented in FIG. 7 swiveled through 90° out of its real position into the drawing plane. As can be recognized without further ado, the angles γ and δ as well as the angles α and β of the FIG. 5 can be adjusted to be randomly small, whereby very small radii can be traced, meaning very small hole penetrations are producible.

As FIG. 7 clarifies, the center of the circle 45 lies on the extension of the rotational movement axis 8. The circularly shaped cut 44 is exclusively produced by means of a rotation through 360° at the movement axis 8, whereby all other nine movement axes are immobile.

Evidently also other geometrical cut shapes can be produced with the laser head 15 in surfaces of workpieces inclined as against the horizontal, for instance also elongated holes of the type depicted in FIG. 5. If thereby the longitudinal axis of the elongated hole is horizontal, then successive movements at the rotational axis 8 and the Y-axis occur during the cutting process.

By appropriate angular adjustments of the central axis of the laser head 5 as against the surface of a workpiece edge cuts deviating from the vertical namely obliquely running edge cuts can be achieved, whereby the position of the point of intersection also lies on the imagined extension of the central axis of the telescopic installation 3 as was shown in the FIGS. 2 and 6 for vertical edge cuts.

For instance in circular recesses holes with conically cut edges are possible with simplified movement control illustrated in the FIGS. 5 and 7, as they could be desirable in accordance with the utilization of the workpiece. Hereby there occurs an adjustment of the swiveling angles α and β or γ and δ as against the situation shown in FIG. 5 or FIG. 7.

In the control the movement axes X, Y, Z and 4 are programmed in a dimensionally precise manner, and the angular adjustments at the movement axes 5 and 7 or 5 and 10 represented by swiveling axes are performed automatically by an additionally predetermined program. The input of radii of holes in the simplified performance of penetrations in workpieces causes the adjustment of swiveling angles at the swiveling axes concerned.

Figure 10:
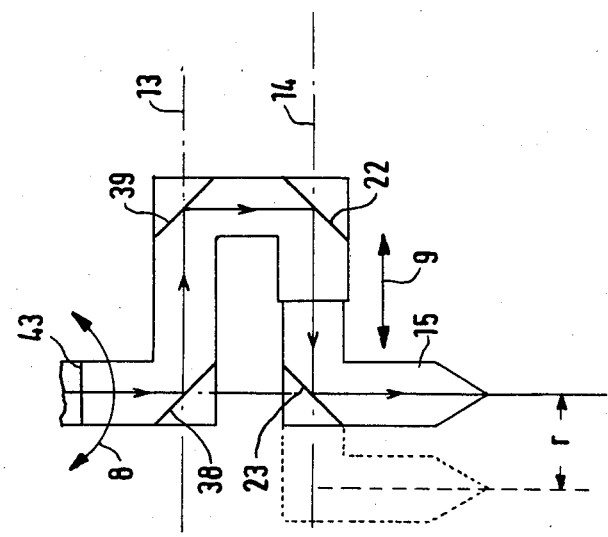
Figure 9:
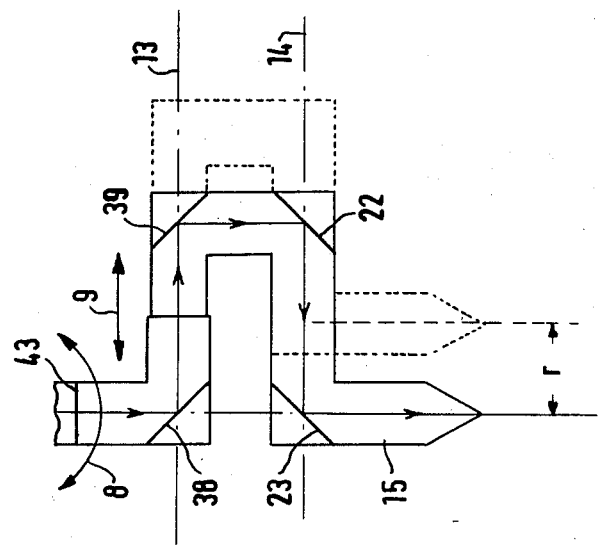

For explaining two variants of a third embodiment version of the inventive device FIGS. 9 and 10 are being referred to. In this embodiment form, the axes 13 and 14 are not swiveling axes, as in the embodiment form according to FIGS. 6–8, rather they are non-swivelable laser beam reflecting axes, of which one is designed to be changeable in length in telescopic fashion as an axis of motion, as the double arrow designated with the reference number 9 illustrates in both figures, while the respectively other axis does not exhibit any changeability in length. The truncated portions of the device according to FIGS. 9 and 10 correspond to those in the FIGS. 6–8.

In FIG. 9 the movement axis 9 is located on the axis 13, while a changeability in length is not provided on the axis 14, meaning the distance of the two reflecting mirrors 22 and 23 remains constant, while the distance of the reflecting mirrors 38 and 39 varies with changes in length. From this it is evident that thereby the laser head 15 can be moved towards the right or left in parallel fashion from its aligned position with the central axis of the not depicted telescopic installation 3, which position is shown in FIG. 9 with full lines. A position of the laser head 15 displaced in parallel fashion is shown in dotted lines. In this manner also a radius r, which can be very small, can be adjusted for production of circular arc cuts at two-dimensional as well as at three-dimensional workpieces. For this purpose merely a displacement on the movement axis 9 has to be performed. If then with programmably adjusted radius r a rotation around the second axis of rotation 8 is performed, a circular arc cut by the laser head 15 ensues.

In the variant shown in FIG. 10 the axis 13 is the laser beam reflection axis not changeable in length, on which are located the reflection mirrors 38 and 39 at a constant distance. The axis 14 on the contrary has a telescope-like lengthening and shortening possibility, whereby the distance of the reflecting mirror 22 and 23 changes. Also in this case the laser beam head 15 can be adjusted towards the right or left, with reference to its axis starting with the aligned position with the central axis of the not depicted telescopic intallation 3 which is shown in solid lines, for adjustment of a radius r for production of circular arc-shaped cuts. A position displaced towards the left is indicated in dotted lines.

The embodiment version of the inventive device according to the FIGS. 9 and 10 permits the programmed adjustment of the radius with only one single linear movement on the movement axis 9, which can lie on the axis 13 or the axis 14. With the guidance device designed in such a way to be sure only circular arc-shaped edges of cuts running perpendicularly to the workpiece surface are possible.

It is evident that FIGS. 11–14 belong to a fourth embodiment version of the guidance device, while the FIGS. 15–19 and 20–25 belong to a fifth or sixth embodiment version of the guidance device. FIGS. 26–29 show details of the device which are valid for all embodiment versions. Identical or similar parts of the device have been given the same reference numbers in the drawings.

In order to explain the fourth embodiment example of the guidance device first of all reference is had to the FIGS. 11–14. Double arrows X and Y designate the coordinate movement axes of the guidance machine (not depicted), with the help of which a vertical telescopic installation 3 can be displaced in the directions of the plane. Double arrow Z designates the vertical movement axis constituted by the telescopic installation 3. The circular arrow 4 symbolizes the fourth movement axis, which is realized at the telescopic installation 3 rotatable through 360° around its central axis. The movement axes X,Y and possibly also Z can be alternatively provided in all embodiment versions also at the depicted machine table, so that the workpiece can be moved on the table in the axes as against the guidance device which remains to be described. In this case the controlled movement axes would be divided between the table and the guidance device.

The laser beam 17 emanating from the $CO_2$ laser unit (not depicted) is reflected at a reflecting mirror 19 in the telescopic installation 3. A horizontal conduit tube 46 is arranged at right angles at the lower end of the telescopic installation 3, into which tube the laser beam is reflected by an additional reflecting mirror 47. At the outer end of the conduit tube 46 there is located a laser beam reflecting axis designed as a horizontal swiveling axis 11, which represents the fifth movement axis designated by the arrow 5. On the swiveling axis 11 there are located two reflecting mirrors 20 and 21 by means of which the laser beam coming from the reflecting mirror 47 is reflected into the swiveling axis 11 or from it into a second telescopic installation 16 connected to the swiveling axis 11, which represents the sixth movement axis of the guidance devive indicated by the double arrow 6.

At the outer end of the second telescopic installation 16 the laser beam swiveling axis 12 is provided, which is arranged parallel to the swiveling axis 11. On this swiveling axis 12 are located the reflecting mirrors 36 and 37. Two additional horizontal laser beam reflection axes 13 and 14 are provided between the laser head swiveling axis 12 and the laser head 15 parallel to the swiveling axes 11 and 12, which are designed as swiveling axes in the device embodiment according to the FIGS. 7–13, which is indicated by the arrows 9 and 10. The arrow 7 assigned to the laser head swiveling axis 12 designates the seventh movement axis of the guidance device, while the arrows 9 and 10 constitute the ninth and tenth movement axes of the described guidance device. The eighth movement axis is obtained by providing a second rotation axis 8 controlled through 360° between the laser head swiveling axis 12 and the adjoining laser beam reflection axis 13, which is marked in the drawings by a corresponding arrow. The mirror pairs 38, 39 or 22, 23 are located on the laser beam reflection axes 13 and 14. The laser head 15 includes the usual focusing device for the laser beam, which is not presented here.

As is evident from FIG. 13, the travel paths of the laser beam along the axes 11–14 are identical, whereby the central axes of the telescopic installation 3 and the laser head 15 are always located in a common vertical plane, if the rotational axis 8 is in its presented zero position, meaning it has not been rotated. As is particularly discernible in FIG. 11, the distance between the central axis of the telescopic installation 3 and the horizontal swiveling axis 11 corresponds to the distance between the laser head swiveling axis 12 and the point of impingement 27 of the laser beam upon the surface of the workpiece 26. The workpiece 26 is depicted in all the drawings merely as a truncated wall portion of the complete workpiece, which can have a complicated three-dimensional shape. The previously mentioned conformity of distances facilitates the programmed adjustment of the point of impingement 27 vertically beneath the central axis of the telescopic installation 3 as is indicated in FIG. 11 for the adjustment case, in which the laser beam impinges upon a vertical surface of the workpiece 26. Hereby the swiveling angle $\alpha$ at the swiveling axis 11 has the value of 90°, while the swiveling angles $\beta$, $\gamma$ and $\delta$ at the swiveling axes 12, 13 and 14 have the values of 90° or 0°. The angles $\alpha$ (FIG. 2) and $\beta$ at the two swiveling axes 11 and 12 are programmable to be so adapted to each other, that the point of impingement 27 of the laser beam 17 upon the surface of the workpiece is always located on the imagined extension of the central axis of the telescopic installation 3, if the swiveling angles $\gamma$ and $\delta$ have the same angular value of 0°, meaning no angular adjustments at the swiveling axes 9 and 10 having occurred, or expressed in another way, that the rotational axis 8 is aligned with the central axis of the laser head 15. It is evident that in this manner the point of impingement 27 is located vertically beneath the central axis of the telescopic installation 3 also then, if the workpiece surface is arranged in an oblique manner and the rotational axis 18 is oriented perpendicularly to it. The simplification in the preparation of a computer program for the computer control movement of the laser head obtainable by this feature is quite evident.

In the FIG. 12 that limited position is presented achievable by adjustments of the swiveling angle $\alpha$, $\beta$ and the second telescopic installation 16, in which the central axis of the first telescopic installation 3 and the laser head 15 are aligned with each other. This adjustment is utilized for laser cuts in the horizontal workpiece area. The laser head 15 hereby because of its aligned adjustment executes all movements, which are predetermined for the guidance device by the guidance machine controlled in the movement axes X and y. The swiveling angles $\gamma$ and $\delta$ not inserted in FIG. 12 have the identical value 0°.

If, starting with the position shown in the FIG. 12, penetrations with at least partially circular arc-shaped course of the cut edge must be applied in horizontal workpiece areas, then the swiveling angles $\gamma$ and $\delta$ at both swiveling axes 9, 10 are so adjusted in conformance with the cut radius 4, that the second rotational axis 8 and the central axis of the laser head 15 run in a parallel manner. If then the laser head 15 is driven rotationally around the second rotational axis 8, then the desired penetration results in the simplest manner.

Correspondingly penetrations with at least partially circular arc-shaped course of the cut edge can be applied also in non-horizontal workpiece areas. For this purpose the swiveling angles $\alpha$ and $\beta$ at both swiveling axes 11 and 12 are adjusted in such a way that the second rotational axis 8 is oriented perpendicularly to the workpiece surface. Hereby the midpoint of the circular arc cut edge coincides with the rotational axis 8. The angles $\gamma$ and $\delta$ are adjusted in the already described manner for adjustment of the cut radius r, whereupon the laser head 15 is driven rotationally around a second rotational axis 8.

The adjustment of the laser head for the cutting of circular-shaped penetrations is indicated with broken lines in the FIG. 12. The shortening of the vertical distance between the reflection axis 13 and the point of intersection generated with this adjustment is compensated by corresponding displacement of the second telescopic installation 16. The swiveling angles $\alpha$ and $\beta$ and the swiveling axes 11 and 12 are to be adjusted correspondingly, in order that the midpoint of the circular arc of the cut edge lies on the imagined extension of the central axis of the first telescopic installation 3. In FIG. 12 the reference number 64 designates a circular-shaped penetration in the truncated horizontal wall of the workpiece 26. The reference numbers 43 and 65 (FIGS. 12, 13) mark the rotational respectively swiveling faces between adjoining parts of the device appearing as transverse lines, whereby the rotational surface 43 is located on the rotational axis 8, while the swiveling surface 65 is assigned to the swiveling axis 11. In the partial device depicted in the FIG. 14 the axes 13 and 14 are not swiveling axes, rather they are non-swivable, meaning fixed, laser beam reflection axes, one of which is designed to be changeable in length in telescope-like manner, thus represents a movement axis which is illustrated by the twin arrow 57. A corresponding telescopic adjustabiliry is achieved if not the laser beam reflection axis 14, rather rhe axis 13 is designed as movement axis 57 changeable in length. The truncated portions of the device in FIG. 14 correspond to those of the FIGS. 11–13. In FIG. 14 an extended position of the laser head 15 displaced in a parallel manner and made possible by the movement axis 57 is drawn in with broken lines. In this manner also a cut radius r can be adjusted whereby circular hole cuts are made possible by a rotational drive of rotational axis 8. Here also the adjustment of the overall device is programmed in such manner that in the penetration cuts in horizontal as well as in noh horizontal workpiece areas the rotational axis 8 is oriented perpendicularly to the workpiece surface and is aligned with the circular arc midpoint.

For explaining the fifth embodiment version the FIGS. 15–19 are now being referred to. In the guidance device discernible from this an additional telescopic installation 49 controllable in a length changing manner is connected to the lower end of the telescopic installation 3, which forms an additional horizontal movement axis 48, as is indicated by a double arrow. On the free end of the telescopic installation 49 there is located a reflecting mirror 51, which reflects the laser beam into a second vertical telescopic installation 16, which is aligned in a permanent parallel manner with respect to the first vertical telescopic installation 3. The thus achieved vertical movement axis 15 is designated by a double arrow. At the lower end of this vertical second telescopic installation, which, if all telescopic installations upstream of it are counted, represents a third telescopic installation controlled in a length changeable manner, a fixed laser beam reflection axis 52 parallel to the laser head swivel axis 12 is provided, upon which are located the reflecting mirrors 63 and 62. The laser beam is reflected to the laser head swivel axis 12 from this laser beam reflection axis 52. The device elements located between the laser head swiveling axis 12 and the laser head 15 are of the same structure as has been described in connection with the fourth embodiment version according to the FIGS. 11–14. The variant of the device shown in FIG. 19 corresponds in principle to that which was described in reference to FIG. 14. To be sure, in the FIG. 19 the laser beam reflection axis 13 is changeable in length, while the laser beam reflection axis 14 is designed as a stationary axis. As has already been mentioned, also by this the movement axis 57 for the adjustment of a cut radius r is made possible.

Because of the so far structurally identical embodiment of the device penetrations with at least partially circular arc-shaped course of the cut edge can be accomplished with the guidance device according to FIGS. 15–19 in all workpiece areas. This is illustrated in FIG. 17 for the horizontal area.

In the FIG. 17 the device is thus adjusted in a program-controlled manner, that the second telescopic installation 49 is brought to a length corresponding to the distance between the laser beam reflection axis 52 at the lower end of the first telescopic installation 16 and the laser head swiveling axis 12. If hereby no angular adjustments at the swiveling axis 9 and 10 are made, meaning if the associated swiveling angles γ and δ have the value of zero, respectively if the movement axis 57 which is changeable in lengthhas notbeen changed in length, then the central axes of the first telescopic installation 3 and the laser head 15 are aligned. If the swiveling angles γ and δ at the swiveling axes 9 and 10 are adjusted in accordance with the desired cutting radius r, as is depicted in FIG. 17 with broken lines, then the midpoint of the circular arc is aligned with the rotational axis 8 and the central axis of the first telescopic installation 3. A rotational drive around the rotational axis 8 then, for instance, produces circular arc-shaped penetrations 54. The required travel length compensation at adjustment of the broken dotted line radius position of the laser head 15 occurs with the help of the second telescopic installation 16, meaning by a displacement of movement axis 50.

Figure 15:
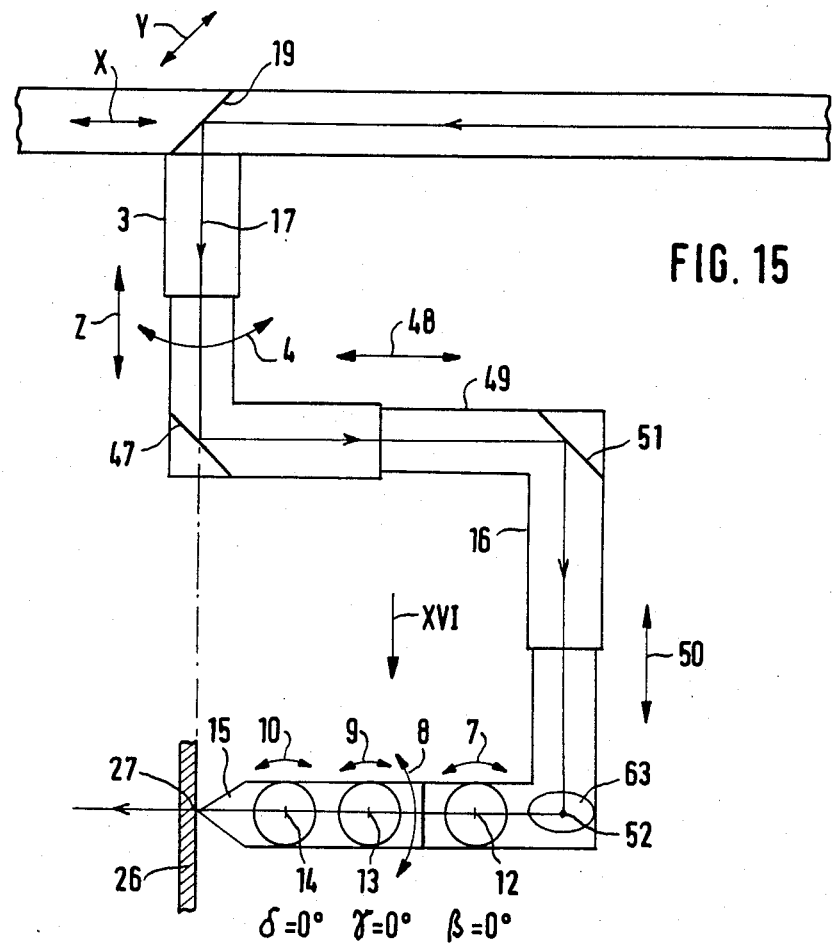
Figure 16:
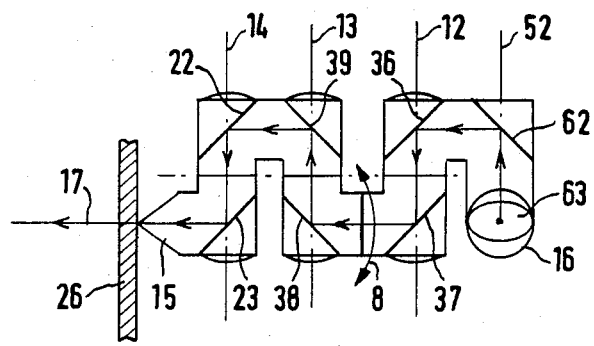

FIG. 15 illustrates the adjustment of the guidance device for cuts in vertical areas of the workpiece 26. Hereby the swiveling angles β, γ and γ amount to respectively 0°, meaning the axes 12, 13 and 14 are located in the same horizontal plane with the fixed laser beam reflection axis 52. As is evident, the point of impingement 27 is also located beneath the central axis of the first telescopic installation 3. This adjustment can also be retained in the interests of simplified programming of cuts in obliquely located workpiece areas, whereby the swiveling angle β is adjusted in such a way that the rotational axis 8, which is aligned with the central axis of the laser head 15 with an appropriate adjustment of the swiveling angles γ and δ, is adjusted perpendicularly to the obliquely oriented workpiece surface. It can be assured by an appropriate shortening or lengthening of the second telescopic installation 49 at the movement axis 48, that the point of impingement 27 is always located vertically beneath the central axis of the first telescopic installation 3. In the case of cuts directed upwards or downwards upon the obliquely positioned workpiece surface the third telescopic installation 16 at the movement axis 50 has to be hereby additionally controlled. This task to be sure can also be assumed by the first telescopic installation 3 through control at the axis Z.

In the limiting position of the guidance device illustrated in FIG. 15 the second telescopic installation 49 is adjusted to a length which corresponds to the horizontal distance between the laser beam reflection axis 52 at the lower end of the third telescopic installation 16 and the point of impingement 27 of the laser beam upon the workpiece surface.

Identical reflection travel lengths are present at all laser beam reflection axes 52, 12, 13 and 14, so that the central axes of the telescopic installation 3 and the laser head 15 are always located in a common vertical plane, assuming that the two additional laser beam reflection axes 13 and 14 are not adjusted for cutting of circular arc-shaped penetrations, respectively if the movement axis 57, which is changeable in length, has not been changed in length in the embodiment according to FIG. 19.

As is evident from the previous description together with the pertaining drawings, the second embodiment version of the guidance device depicted in FIGS. 15–18 is also equipped with ten movement axes, if the coordinate axes X and Y are also counted, namely with the axes X, Y, Z, 4, 48, 50, 7, 8, 9 and 10. For many applications it can be sufficient if instead of the third vertical telescopic installation 15 a reflection unchangeable in distance is provided between the 45° mirror 51 of the second telescopic installation 49 and the fixed laser beam reflection axis 52. In that case only nine movement axes exist. In the design of the device corresponding to the variant according to FIG. 19 there is always one less movement axis present, because the movement axis 57 replaces the two movement axes 9 and 10. In any case the laser beam 17 is reflected in the guidance device according to the second embodiment version at the following reflecting mirrors until it exits from the laser head 15: 19, 47, 51, 63, 62, 36, 37, 38, 39, 22 and 23.

Figure 20:
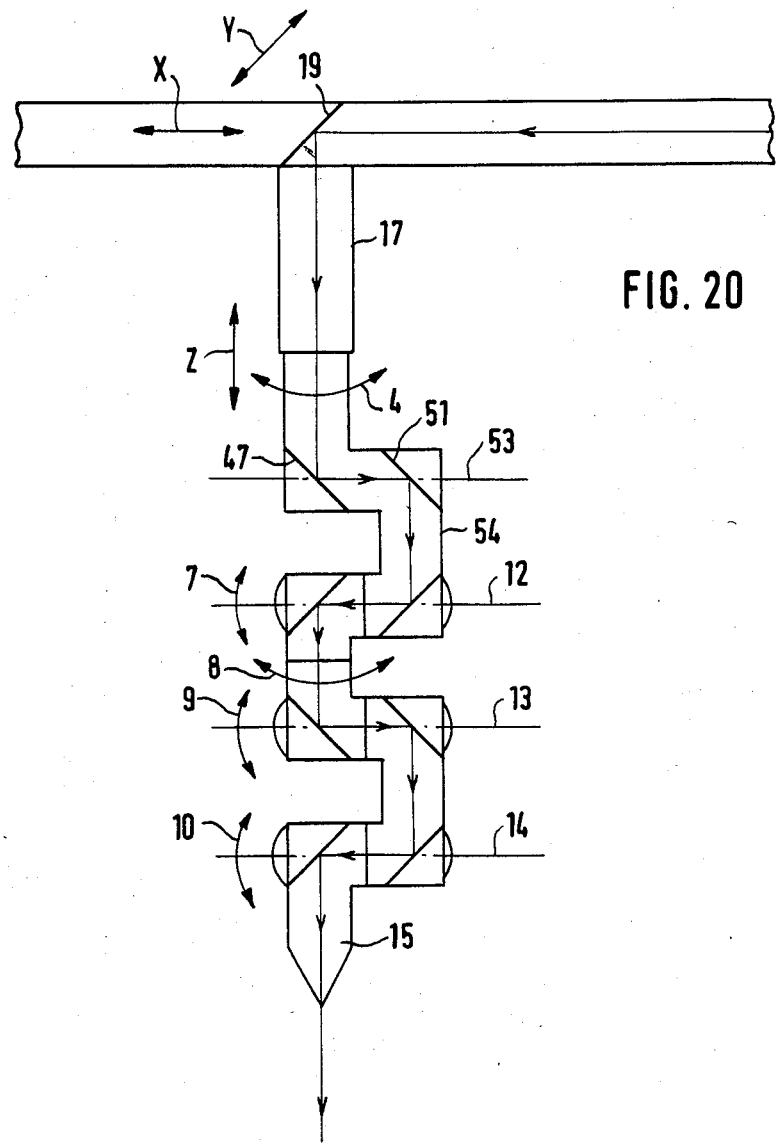
Figure 21:
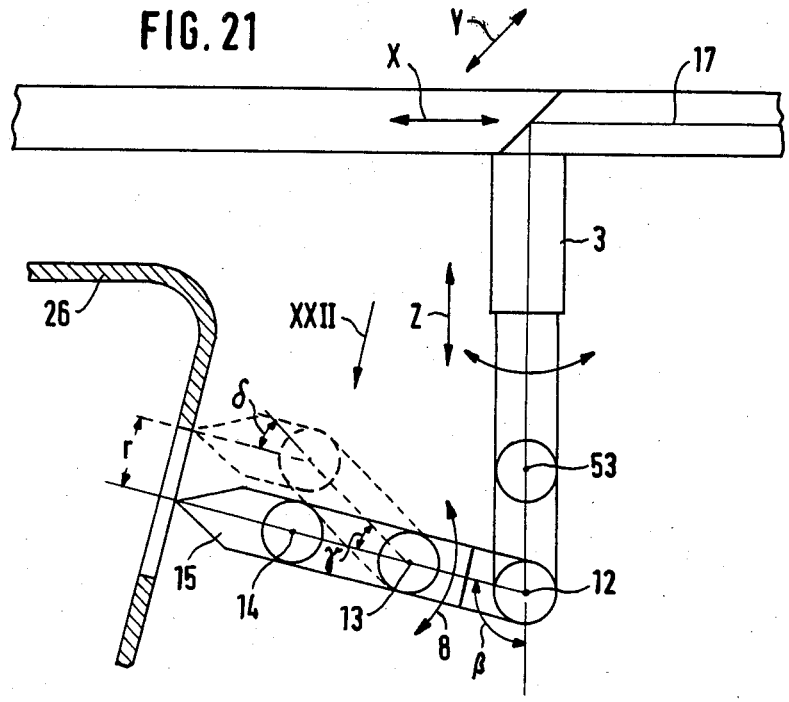
Figure 22:
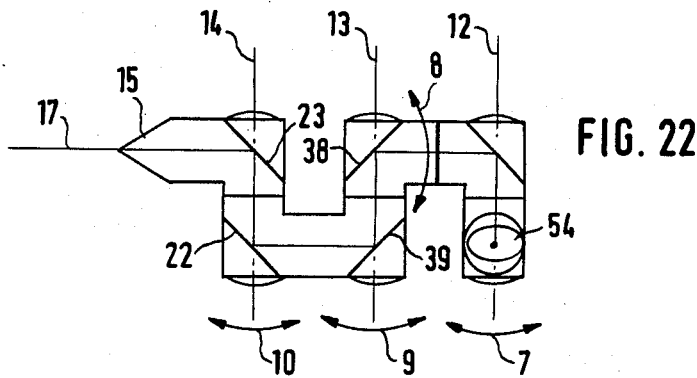

For an explanation of the sixth embodiment version of the guidance device reference is had to start off with to the FIGS. 20–22. In this embodiment version a horizontal, fixed laser beam reflection axis 53 arranged parallel to the laser head swiveling axis 12 is connected at the lower end of the telescopic installation, by means of which the laser beam 17 is reflected to the laser head swiveling axis 12. The already repeatedly described laser beam reflection axes 13 and 14 follow the laser head swiveling axis 12, which are also arranged horizontally and parallel to the laser head swiveling axis. These laser beam reflection axes 13 or 14 are again designed either as swiveling axes 9, 10, or one of them is designed as a stationary axis and the other as a movement axis 57 changeable in its length, as this is presented in the FIG. 24, in which the movement axis changeable in length coincides with the laser beam reflection axis 14. But also the reverse arrangement, in which the laser beam reflection axis 13 is the movement axis 57 changeable in length, while the laser beam reflection axis 14 is the stationary axis, is also possible. In between the two axes 12 and 13 again the second rotational axis 8 controlled through 360° is provided. The laser beam reflection travels along the axes 53, 12, 13 and 14 are again equally large as is made clear in FIG. 20, so that the central axes of the telescopic installation 3 and the laser head 15 are always located in a common vertical plane, if the two additional laser beam reflection axes 13, 14 are not adjusted for the cutting of circular arc-shaped penetrations. These conditions exist then, if the two swiveling axes 9, 10 are not swiveled respectively if the movement axis 57 in the embodiment version according to FIG. 24 has not been changed in length. In these positions the rotations around the rotational axis 8 have no influence upon the position of the central axis of the laser head 15. With the device built up in this fashion penetrations with at least partially circular arc-shaped course of the cut edge can be applied in a simple manner in all workpiece areas without further ado in the already described fashion. For this purpose to start off with the rotational axis 8 is adjusted to be vertical with respect to the workpiece surface and aligned with the midpoint of the circular arc to be cut. After that the laser head 15 is adjusted to the desired cut radius r as this is indicated in FIGS. 21 and 24 with broken lines, prior to driving the rotational axis in a rotating manner.

Figure 23:
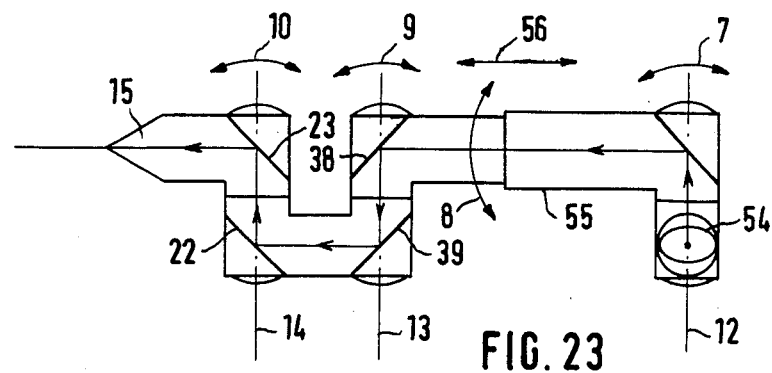
Figure 24:
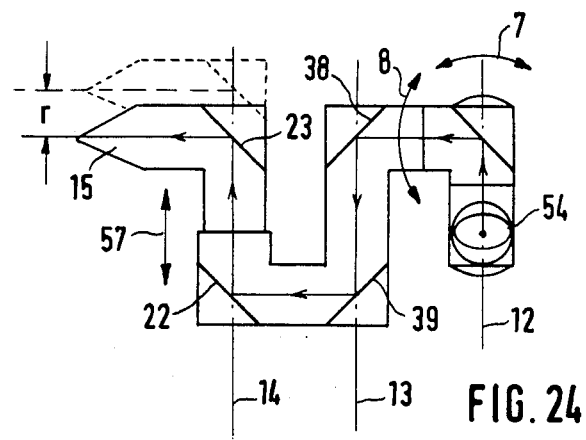
Figure 25:
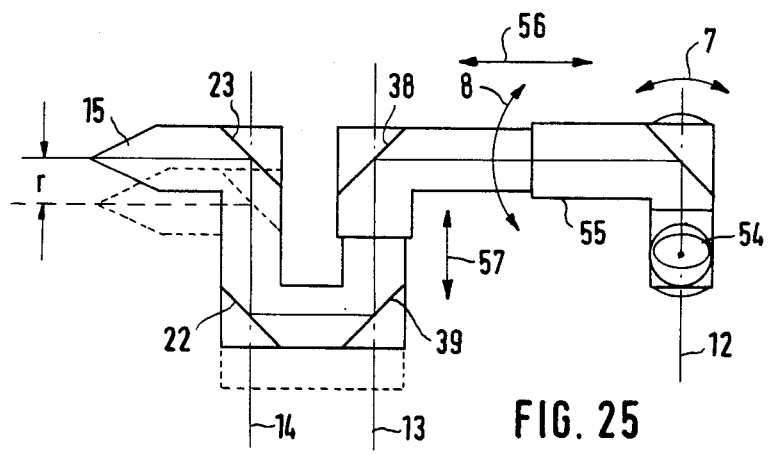

It is common to the two modifications of the device shown in FIGS. 23 and 24 that the rotational axis 8 provided between the laser head swiveling axis 12 and the adjacent laser head reflection axis 13 is designed at the same time as a telescopic installation 55 and thus at the same time as a movement axis 56 changeable in length. By this an additional adjustment possibility for the laser head 15 is achieved. In the modification according to FIG. 23 the two laser beam reflection axes 13 and 14 are designed as swiveling axes 9 and 10. In the embodiment according to FIG. 25 on the other hand one laser beam reflection axis, axis 14 in the example shown, is immobile, while the other laser beam reflection axis, 13 in the example shown, is provided as a movement axis 57 changeable in length.

As is illustrated in FIG. 20 the distances between the axes 53,12,13 and 14 are equally large. It can, however, be an advantage according to the application area of the guidance device, if the distance between the axes 53 and 12 is designed to be larger than the remaining distances. For this purpose the conduit tube 54 provided between the axes 12 and 53 is to be appropriately lengthened. FIG. 21 makes clear that with the help of this guidance device also those workpiece areas are reachable without further ado, which are designed undercut when viewed from above.

Figure 26:
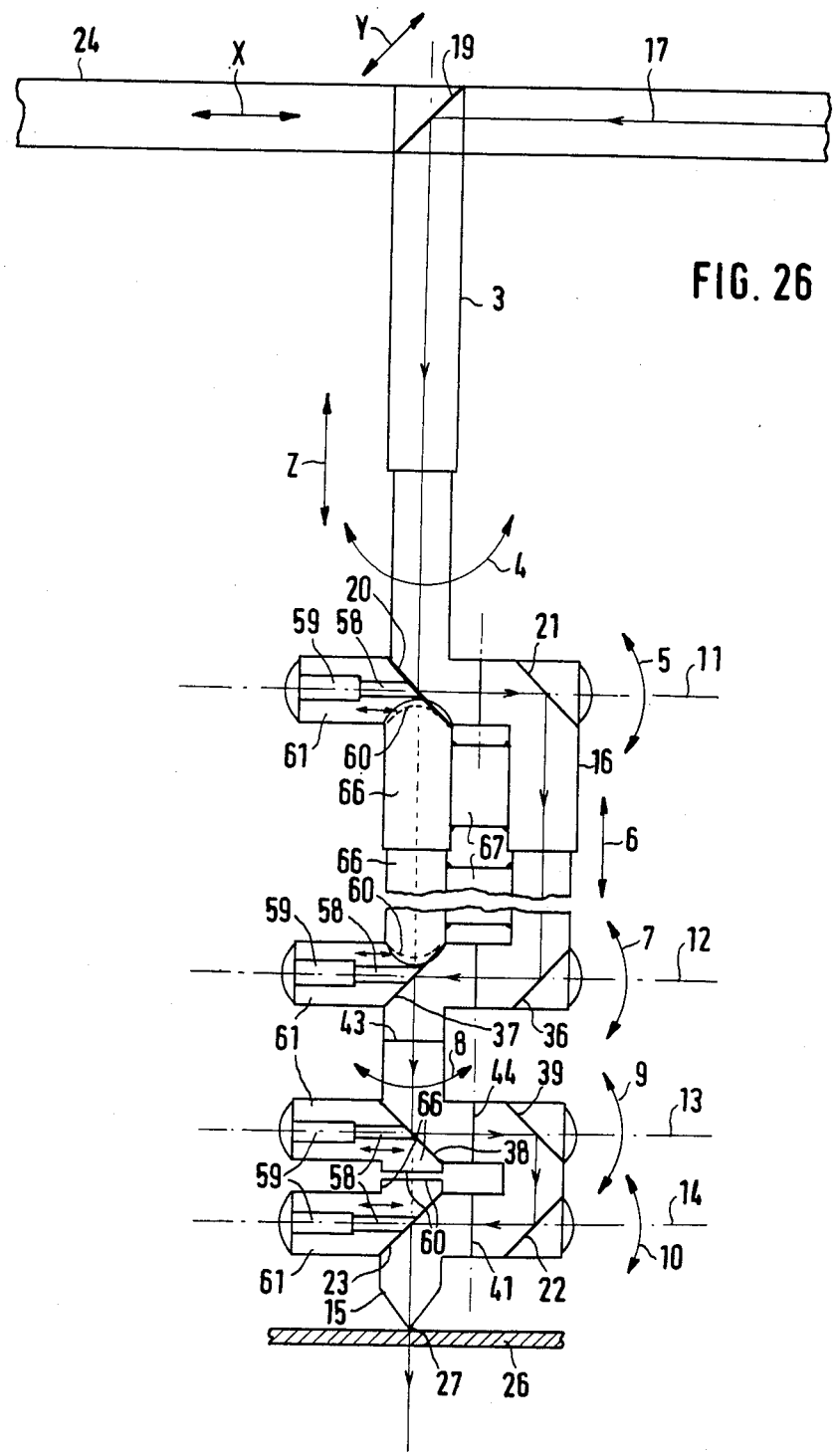
FIG. 26 front view of a guidance device equipped with four swiveling axes, presented in distended vertical position for the laser cut at horizontal areas of a workpiece and equipped with elements for shortening of the beam travel through a displacement of reflecting mirrorrs, FIG. 27 a side view of the device according to FIG. 26, however with another embodiment of the two laser beam reflection axes adjacent to the laser head, adjusted for a laser cut at an obliquely extending wall of a workpiece, FIG. 28 a truncated side view of the lower area of a guidance device, adjusted for a circular hole cut in a vertical wall of a workpiece, and FIG. 29 a truncated side view similar to FIG. 28, however adjusted for a hole cut with conical edge cut in a vertical wall of a workpiece.
Figure 27:
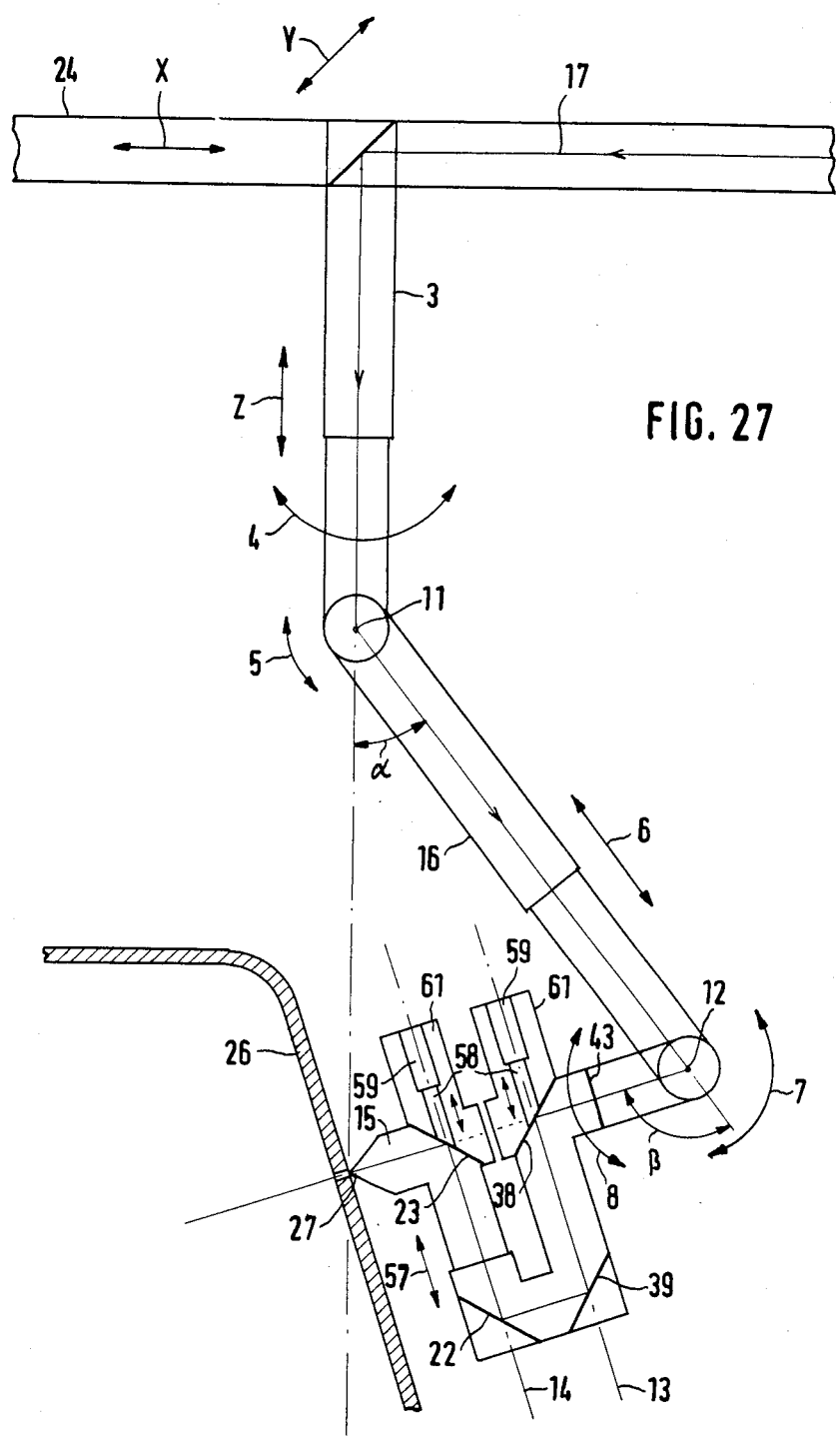

In all the described embodiment versions of the guidance device respectively one reflection mirror is provided on the laser beam reflection axes, irrespective whether one deals with fixed or movable axes, whereby the laser beam is repeatedly reflected. This is the assumption for the extraordinary adaptability of the inventive device to all machining situations occurring with two- and three-dimensional workpieces. For certain machining situations the multiplicity of the existing reflections is not required. Emanating from this consideration the designs drawn in the embodiment examples in FIGS. 26 and 27 are proposed. Hereby it is provided that the laser beam reflection axes 13 and 14 following upon the second rotational axis 8 (FIG. 27) or the two neighboring parallel laser beam reflection axes 13,14 or 11,12; 13, 14 respectively following upon both rotational axes 4, 8 (FIG. 27) the two mirrors 38, 23 respectively 20, 27; 38, 23 located on the rotational axis concerned or on its imagined extension are arranged to be displaceable in common in parallel fashion for the unblocking of a straight passage of the laser beam 17 aligned with the central axis of the laser head 15 and the rotational axis 8, respectively the rotational axes 4,8. With this as simple as it is effective manner, by simple displacement in pairs of mirrors lying opposite each other, inasmuch as their rear faces enclose in pairs an angle of 90°, the laser beam reflection can be cancelled at respectively two axes and the laser beam can be made to transit directly from one axis to the other axis. Hereby it goes without saying that an alignment position between the components concerned must be automatically produced by means of an appropriate program control, in order that the laser beam cannot deviate out of the guidance device prior to reaching the laser head 15.

As is evident from FIGS. 26 and 27, the displaceable mirrors 20, 37; 38, 23 can be designed for a pneumatic, hydraulic or electromotor driven drive and are connected for this purpose with guidance rods 58 or such like in a rigid manner, which on their part engage in guidance bushings 59 or such like, which are fastened in housing extensions 61 of housing belonging to the laser beam reflection axes. The design of the drive elements of the mirrors require high precision commensurate with the required laser beam adjustment.

In the embodiment example according to FIG. 26 displaceable mirrors are provided at all four laser beam reflection axes 11–14, whereby the laser beam can fall out of the telescopic installations free directly through the housing of the rotational axis 8 into the laser head 15 without any beam reflection, if all four displaceable mirrors are displaced. Since the mirrors are displaceable in pairs, namely 20, 37 on the one hand and 38, 23 on the other hand, these two pairs of mirrors can be displaced independently from each other respectively they can be left in their reflecting position.

While in the embodiment example of FIG. 26 the displaceable pair of mirrors 38, 23 is arranged on the laser beam reflection axes 13, 14 designed as swiveling axes 9, 10, in the embodiment example in FIG. 27 the mirrors 38, 23 are provided on the laser beam reflection axes 13, 14, of which one is designed as an immobile axis and the other as movement axis 57 changeable in length, as this has already been repeatedly described with reference to the FIGS. 14, 19, 24 and 25. The mirrors 38, 23 can hereby evidently only be displaced then, which is accomplished by the program control, if the movement axis 57 has not been changed in length, meaning if the rotational axis 8 and the central axis of the laser head 15 are in an aligned position.

In order that the laser beam can issue from the housings with displaced pairs of mirrors, apertures 60 are provided in the housings of the laser beam reflection axes. Tube-shaped laser beam sheaths 66 are located between apertures 60 located respectively opposite each other. The laser beam sheaths 66 between the axes 11 and 12 (FIG. 26) engage with each other in telescope fashion and are respectively connected rigidly with the assigned telescopic element of the telescopic installation 16 by means of crossbars 67.

Figure 28:
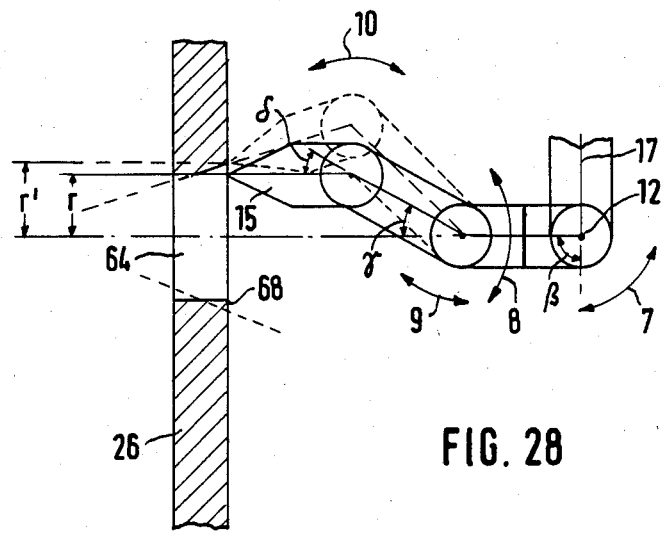

To the extent that the device is intended for the cutting of penetrations with at least partially circular arc-shaped course of the cut edge, in all embodiment versions of the invention the adjustment of the device for the production of such cut edges have been described, which run perpendicular to the workpiece surface, in which the penetrations have to be made. The guidance device is, however, adjustable in such a way in all its embodiment versions that cut edges extending conically can be achieved. For explanation of the appropriate adjustment of the device reference is had in the following to FIGS. 28 and 29. It is illustrated in FIG. 28 how in a circularly-shaped penetration 64 with cut edge extending parallel to the rotational axis 8 previously cut into the workpiece 26 subsequently the outer hole edge is provided with a chamfer 68. For this purpose the swiveling angle $\beta$ at the laser head swivel axis 12 is adjusted in such a way, that the second rotational axis is oriented perpendicularly to the workpiece surface and is aligned with the midpoint of the circularly shaped penetration 64. The swiveling angles $\gamma$ and $\delta$ at the two swiveling axes 9, 10 are, as the broken line penetration makes clear, so adjusted in accordance with the cut radius r desired, that the second rotational axis 8 and the central axis of the laser head 15 enclose an angle corresponding to the angle of the cone. Since the cut radius r' is larger than the cut radius r of the perviously cut penetration, the chamfer 68 is formed when the laser head 15 is rotationally driven around the rotational axis 8.

If on the other hand a conical penetration 68 through the entire wall thickness of the workpiece 26 has to be cut, then the adjustment of the device from the start is accomplished in such a manner as has been described with reference to the application of the chamfer 68 according to FIG. 28. The adjustment of the device can be discerned from FIG. 29. It is of advantage for the work phases described in reference to FIGS. 28 and 29 if the rotational axis 8 is designed simultaneously as a telescopic installation and thus at the same time as a movement axis changeable in length, as it has been described in reference to FIGS. 23 and 25. In this manner, one can account for a reduction of the distance between the swiveling axis 12 and the surface of the workpiece 26 with a conical adjustment of the laser head 15 without movement at the X- or Y-movement axis. Hereby, the rotational axis simultaneously designed as a telescopic installation permits the required distance compensation.

Figure 29:
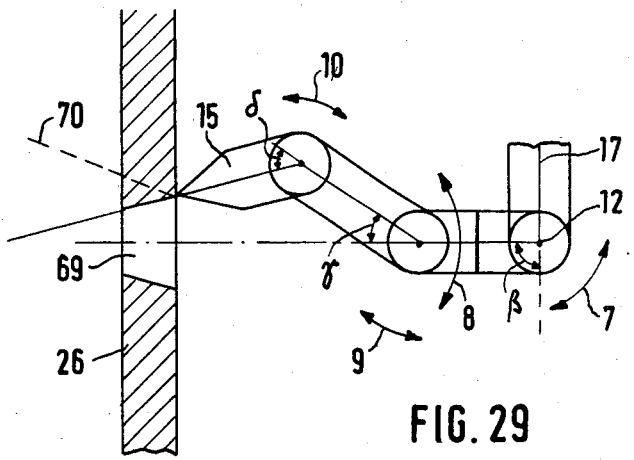

The adjustment of the device for the cutting task illustrated in the FIGS. 28 and 29 can evidently also occur in such a way that in the case of FIG. 28 the conical chamfer occurs at the annular edge lying inside in the workpiece 26 respectively that in FIG. 28 the conical penetration widens from the outside towards the inside, as this has been indicated by the broken line 70.

All embodiment versions of the inventive guidance device are actuated by computer programmed control, they can, however, also completely or in partial areas of the different movements be programmed in the teach-in process, or by independently programmable and repeatable follow-up control.

I claim:

1. Guidance device for a laser beam repeatedly reflected at 45° mirrors for three-dimensional machining of workpieces, with five controlled axes of motion, of which a first and second axes of motion are the horizontal coordinate axes X and Y, a third and fourth axes of motion are realized coaxially in a rotatable telescopic installation which is variable in length and the fourth axis of motion is a horizontal swiveling axis, around which the laser head can be swiveled, whereby beginning with the third axis of motion a self-supporting design is provided, wherein the improvement comprises that an additional axis of motion (5) designed as a horizontal swiveling axis (11) is provided parallel to the laser head swiveling axis (14), the distance from the additional horizontal swiveling axis (11) to the laser head swiveling axis is larger than the length of the laser head (15), whereby the laser beam reflection at the additional swiveling axis (11) is provided in such a way that the central axes of the telescopic installation (3) and the laser head (15) are always located in a common vertical plane, and that the swiveling angles ($\alpha$, $\beta$) at the additional swiveling axis (11) and the laser head swiveling axis (14) are adapted to each other in a programmable- and adjustable manner according to the position of the workpiece surface to be machined.

2. Guidance device according to claim 1, characterized in that the swiveling angles ($\alpha,\beta$) are adjusted to be equally large at the laser head swiveling axis (14) and the adjoining additional horizontal swiveling axis (11) for cutting of penetrations with at least a partially circular arc-shaped extent of the cutting edge (30,31) in horizontal workpiece areas, and that the telescopic installation (3) is rotatably driven around its axis of rotation (4) for producing this circular arc-shaped cut.

3. Guidance device according to claim 1 or 2, characterized in that the laser beam (17) is guided in between the two swiveling axes (11, 14) with formation of an additional movement axis (6) by an additional telescopic installation (16) controlled so as to be variable in length.

4. Guidance device for a laser beam repeatedly reflected at 45° mirrors for three-dimensional machining of workpieces, with five controlled movement axes, of which the first and second movement axes are the horizontal ordinate axes X and Y, the third and fourth movement axes are coaxially realized in a rotatable vertical telescopic installation variable in length and the fifth movement axis is a horizontal swiveling axis, around which the laser head is swivelable, whereby starting with the third movement axis a self-supporting design is provided, characterized in that three additional movement axes (5, 7, 9) designed as horizontal swiveling axes (11, 12, 13) are provided parallel to the laser head swiveling axis (14), the distance between a first and a second said swiveling axis (11, 12) downstream of the telescopic installation (3) is larger than the sum of the distances between the second and a third swiveling axis (12,13) and between the third swiveling axis (13) and the laser head swiveling axis (14) increased by the length of the laser head (15), whereby the laser beam reflection at all swiveling axes (11 to 14) is provided in such a way that the central axes of the telescopic installation (3) and the laser head (15) are aligned with each other, if the swiveling angles at all swiveling axes have the value zero, and that between the second and third swiveling axis (12, 13) a second axis of rotation (8) controllable through 360° is provided.

5. Guidance device according to claim 4, characterized in that the swiveling angles (α,β) at the first and second horizontal swiveling axis (11, 12) are programmed and adjusted to be adapted in such a way to each other, if the value of the swiveling angles at the third swiveling axis (13) and the laser head swiveling axis (14) is zero, that the point of impingement (27) of the laser beam (17) upon the workpiece surface is located on the imagined extension of the central axis of the telescopic installation (3).

6. Guidance device according to claim 4, characterized in that for the cutting of penetrations with at least a partially circular arc-shaped extent of the cutting edge in non-horizontal workpiece areas the swiveling angles (α,β) at the first and second swiveling axis (11, 12) are adjusted in such a way that the second axis of rotation (8) is oriented perpendicularly to the workpiece surface, while the swiveling angles (γ,δ) at the third swiveling axis (13) and the laser head swiveling axis (14) are so adjusted in accordance with the radius of the cut r, that the second axis of rotation (8) and the central axis of the laser head (15) run parallel to each other, and that the laser head (15) is rotatably driven around the second axis of rotation (8).

7. Guidance device according to one of the claims 4 to 6, characterized in that the laser beam (17) is guided between the first swiveling axis (11) and the second swiveling axis (12) by an additional telescopic installation (16) controlled to be variable in length in between these two swiveling axes with formation of an additional movement axis (6).

8. Guidance device for a laser beam repeatedly reflected at 45° mirrors for three-dimensional workpiece machining, with five controlled movement axes, of which a first and second movement axes are the horizontal coordinate axes X and Y, a third and fourth movement axes are realized coaxially in a rotatably vertical telescopic installation variable in length and a fifth movement axis is a horizontal swiveling axis for the laser head, whereby starting with the third movement axis a self-supporting design is provided, characterized in that an additional movement axis (5) designed as horizontal swiveling axis (11) is provided parallel to the swiveling axis (12) of the laser head (15), that between the swiveling axis (12) of the laser head (15) and the laser head two additional horizontal laser beam reflection axes (13', 14') are provided parallel to the two swiveling axes (11, 12), of which the one is designed as a stationary axis and the other as a telescopic axis (9), that between the swiveling axis (12) of the laser head (15) and the neighboring laser beam reflection axis (13') a second axis of rotation (8) controlled through 360° is provided, that the distance between the two swiveling axes (11, 12) is larger than the sum of the distances between the swiveling axis (12) of the laser head and the laser head beam reflection axis (14') adjacent to the laser head increased by the length of the laser head (15), and that the laser beam reflection at the swiveling axes (11, 12) and the two additional laser beam reflection axes (13', 14'), are provided in such a way that the central axes of the telescopic installation (3) and of the laser head (15) are aligned with each other, if the swiveling angle at the two swiveling axes has the value of zero and the telescopic axis has not been changed in length.

9. Guidance device according to claim 8, characterized in that the swiveling angles (α,β) at the two horizontal swiveling axes (11, 12) are programmed to be adapted to each other in such a way that the point of impingement (27) of the laser beam (17) upon the workpiece surface is located on the imagined extension of the central axis of the telescopic installation (3), if the telescopic axis (13' or 14') has not been changed in length.

10. Guidance device according to claim 8, characterized in that the swiveling angles (α,β) and the two swiveling axes (11, 12) are adjusted in such a way for cutting of penetrations with at least a partial circular arc-shaped extent of the cutting edge in non-horizontal workpiece areas, that the second axis of rotation (8) is oriented perpendicularly to the workpiece surface, while the telescopic axis (13' or 14') is adjusted to be changeable in length in accordance with the cut radius r, and that the laser head (15) is rotatably driven around the second axis of rotation (8).

11. Guidance device according to one of the claims 8 to 10, characterized in that the laser beam (17) is guided between the two swiveling axes (11, 12) by an additional telescopic installation (16) controlled to be variable in length with formation of an additional movement axis (6).

12. Guidance device for a repeatedly reflected laser beam at 45° mirrors for three-dimensional workpiece machining, with a plurality of controlled movement axes, of which a first and second movement axes are the horizontal coordinate axes X and Y, a third and fourth movement axis are realized coaxially in a rotatable vertical telescopic installation variable in length or such like and the first movement axis is a horizontal swiveling axis, around which the laser heasd is swivelable, whereby starting with the third movement axis, a self-supporting design is provided, characterized in that a horizontal conduit tube (46) is fastened at the lower end of the telescopic installation (3), into which the laser beam is reflected at a 45° mirror (47), that an additional movement axis (5) designed as a horizontal swiveling axis (11) is provided parallel to the laser head swiveling axis (12) at the end of the conduit tube (46), that between the laser head swiveling axis (12) at the laser head (15) two additional horizontal laser beam reflection axes (13, 14) parallel to the two swiveling axes (11, 12) are provided, which are one of both designed as horizontal swiveling axes (9, 10), and one is designed as a stationary axis and the other as a movement axis (57) variable in length, that between the laser beam swiveling axis (12) and the neighboring laser beam reflection axis (13) a second axis of rotation (8) controllable through 360° is provided, and that the laser beam reflection at the swiveling axes (11, 12) and the two additional laser beam reflection axes (13, 14) is provided in such a way that the central axes of the telescopic installation (3) and the laser head (15) are always located in a common vertical plane, if said two additional laser beam reflection axes (13, 14) are not adjusted for cutting of circular arc-shaped penetrations.

13. Guidance device according to claim 12, characterized in that the angular adjustments at the two horizontal swiveling axes (11, 12) are programmable to be adapted to each other in such a way that the point of impingement (27) of the laser beam (17) is located upon the workpiece surface on the imagined extension of the central axis of the telescopic installation (3), if no angular adjustments have occurred at the two additional swiveling axes (13, 14), or if the laser beam reflection axis variable in length has not been changed in length.

14. Guidance device according to the claims 12 or 13, characterized in that the distance between the central axis of the telescopic installation (3) and the additional horizontal swiveling axis (11) corresponds to the distance between the laser head swiveling axis (12) and the point of impingement (27) of the laser beam upon the workpiece surface.

15. Guidance device according to claim 12, characterized in that the swiveling angles ($\alpha$, $\beta$) at the two swiveling axes (11, 12) are so adjusted in all workpiece areas for cutting of penetrations with at least a partially circular arc-shaped extent of the cutting edges, that the second axis of rotation (8) is oriented perpendicularly to the workpiece surface, while the swiveling angles ($\gamma,\delta$) at the two additional swiveling axes (9, 10) are so adjusted in accordance with the cut radius r, that the second axis of rotation (8) and the central axis of the laser head (10) run parallel with each other, or while the laser beam reflection axis (57) changeable in length has been adjusted to be changed in length in accordance with the cut radius r, and that the laser head (15) is rotatably driven around the second axis of rotation (8).

16. Guidance device according to claim 15, characterized in that the swiveling angles ($\alpha,\beta$) are so adjusted at the two swiveling axes (11, 12), that the circular arc center of the cutting edge is located upon the imagined extension of the central axis of the first telescopic installation (3).

17. Guidance device according to one of the claims 12, 13, 15, or 16, characterized in that between the two swiveling axes (11, 12) the laser beam is guided through an additional telescopic installation (16) controlled to be changeable in length with formation of an additional movement axis (6).

18. Guidance device for a laser beam repeatedly reflected at 45° mirrors for three-dimensional workpiece machining, with several controlled movement axes, of which a first and second movement axes are the horizontal coordinate axes X and Y, a third and fourth movement axes are realized coaxially in a rotatable vertical telescopic installation variable in length and a fifth movement axis is a horizontal swiveling axis, around which the laser head is swivelable, whereby starting with the third movement axis a self-supporting design is provided, characterized in that a second telescopic installation (49) controlled to be variable in length is attached at the lower end of the telescopic installation (3) with formation of an additional horizontal movement axis (48) into which the laser beam is reflected at a 45° mirror (47) and at which a third telescopic installation (16) controlled to be variable in length is attached with formation of an additional vertical movement axis (50), into which the laser beam (17) is reflected at a 45° mirror (51), that at the lower end of the third telescopic installation (16) a fixed laser beam reflection axis (52) parallel to the laser head swiveling axis (12) is provided, from which the laser beam is reflected to the laser head swiveling axis (12), that between the laser head swiveling axis (12) and the laser head (15) two additional horizontal laser beam reflection axes (13, 14) parallel to the laser head swiveling axis are provided, which are one of both designed as horizontal swiveling axes (9, 10), and one is designed as a stationary axis and the other as a movement axis (57) variable in length, that between the laser head swiveling axis (12) and the neighboring laser beam reflecting axis (13) a second axis of rotation (8) controllable through 360° is provided, and that the laser beam reflection at the laser head swiveling axis (12) and the three laser beam reflection axes (52, 13, 14) are provided in such a way, that the central axes of the telescopic installation (3) and the laser head (15) are always located in a common vertical plane, if the two additional laser beam reflection axes (13, 14) are not adjusted for cutting of circular arc-shaped penetrations.

19. Guidance device according to the claim 18, characterized in that the second telescopic installation (49) is adjustable to a length corresponding to the distance between the laser beam reflection axis (52) at the lower end of the third telescopic installation (16) and the laser head swiveling axis (12), in such a way that the central axes of the first telescopic installation (3) and of the laser head (15) are aligned with each other, if no angular adjustments at the two additional swiveling axes (9, 10) have occurred, or if the laser beam reflection axis (57) variable in length has not been changed in length.

20. Guidance device according to the claims 18 or 19, characterized in that the second telescopic installation (49) is adjustable to a length, which corresponds to the horizontal distance between the laser beam reflection axis (52) at the lower end of the third telescopic installation (16) and the point of impingement (27) of the laser beam upon the workpiece surface.

21. Guidance device according to claim 18, characterized in that the swiveling angle ($\beta$) at the laser head swiveling axis (12) is adjusted in such a way for cutting of penetrations with at least a partial circular arc-shaped extent of the cutting edge, that the second axis of rotation (8) is oriented perpendicularly to the workpiece surface, while the swiveling angles ($\gamma,\delta$) at the two additonal swiveling axes (9, 10) are so adjusted in accordance with the cut radius r one of the second axis of rotation (8) and the central axis of the laser head (15) run parallel to each other, and the laser beam reflection axis (57) variable in length has been changed in length in accordance with the cut radius r, and that the laser head (15) is rotatably driven around the second axis of rotation (8).

22. Guidance device according to the claims 18 and 21, characterized in that the second telescopic installation (49) is so adjusted for cutting penetrations in horizontal workpiece areas, that the center of the circle of the cutting edge is located on the imagined extension of the central axis of the first telescopic installation (3).

23. Guidance device according to one of the claims 18 to 20, characterized in that instand of the third vertical telescopic installation (16) a reflection not changeable in spacing is provided between the 45° mirror (51) of the second telescopic installation (49) and the fixed laser beam reflection axis (52).

24. Guidance device for a laser beam repeatedly reflected at 45° mirrors for three-dimensional workpiece machining, with a plurality of controlled movement axes, of which a first and a second movement axes are the horizontal coordinate axes X and Y, a third and a fourth movement axis are realized coaxially in a rotatable vertical telescopic installation variable in length of such like and a fifth movement axis is a horizontal swiveling axis, around which the laser head is swivelable, whereby beginning with the third movement axis a self-supporting design is provided, characterized in that at the lower end of the telescopic installation (3) a horizontal fixed laser beam reflection axis (53) is fastened arranged to be parallel to the laser head swiveling axis (12), by means of which the laser beam (17) is reflected to the laser head swiveling axis (12), that between the laser head swiveling axis (12) and the laser head (15) two additional horizontal laser beam reflection axes (13, 14) parallel to the laser head swiveling axis (12) are provided, which are one of both designed as horizontal swiveling axes (9, 10), and which one is designed as a stationary axis and the other as a movement axis (57) variable in length, that between the laser swiveling axis (12) and the neighboring laser beam reflection axis (13) a second axis of rotation (8) controllable through 360° is provided, and that the laser beam reflection at the fixed laser beam reflection axis (53), the laser head swiveling axis (12) and the two additional laser beam reflection axes (13, 14) is provided in such a way that the central axes of the telescopic installation (3) and the laser head (15) are always located in a common vertical plane, if the two additional laser beam reflection axes (13, 14) are not adjusted for cutting of circular arc-shaped penetrations.

25. Guidance device according to claim 24, characterized in that the swiveling angle (β) is so adjusted at the laser head swiveling axis (12) for cutting of penetrations with at least a partial circular arc-shaped extent of the cutting edge in all workpiece areas, that the second axis of rotation (8) is oriented perpendicularly to the workpiece surface, while the swiveling angles (γ,δ) at the two additional swiveling axes (9, 10) are so adjusted in accordance with the cut radius r, that one of the second axis of rotation (8) and the central axis of the laser head (15) run parallel to each other, and the laser beam reflection axis (57) variable in length has been adjusted to be changed in length in accordance with the cut radius r, and that the laser head (15) is rotatably driven around the second axis of rotation (8).

26. Guidance device according to one of the claims 12–16, 18, 19, 21, 24 or 25, characterized in that the axis of rotation (8) provided between the laser head swiveling axis (12) and the neighboring laser beam reflection axis (13) is at the same time designed as a telescopic installation (55) and thus simultaneously as a movement axis (56) variable in length.

27. Guidance device according to one of the claims 12–16, 18, 19, 21, 24 or 25, characterized in that at the two neighboring parallel laser beam reflection axes (11, 12, 13, 14) following upon the second axis of rotation (8) or respectively following upon the two axes of rotation (4; 8) the two mirrors (20, 37; 38, 23) located on the axis of rotation concerned or on its imagined extension are arranged to be commonly displaceable in a parallel manner for unblocking a straight passage for the laser beam aligned with a central axis of the laser head (15) and the axis of rotation (8) or the axes of rotation (4; 8).

28. Guidance device according to the claim 27, characterized in that the displaceable mirrors (20, 37; 38, 23) are designed for the pneumatic, hydraulic or electromotor drive and are rigidly connected with guide rods (58), which engage into guide bushings (59) or such like in a displaceable manner.

29. Guidance device according to the claims 27 and 28, characterized in that apertures (60) are provided in the housings of the laser beam reflection axes (11, 12; 13, 14) for the passage of the laser beam with the mirrors (20, 37; 38, 23) displaced.

30. Guidance device according to claim 29, characterized in that the tube-shaped laser beam covers (66) are provided between apertures (60) lying respectively opposite each other.

31. Guidance device according to one of claims 12, 18 or 24, characterized in that the swiveling angle (β) at the laser head swiveling axis (12) is adjusted in such a way for cutting of penetrations with at least a partially circular arc-shaped extent of the cutting edge for fabrication of conical cutting edges, that the second axis of rotation (8) is oriented perpendicularly to the workpiece surface, while the swiveling angles (γ,δ) at the two additional swiveling axes (9, 10) are so adjusted in accordance with the cut radius r, that the second axis of rotation (8) and the central axis of the laser head (15) enclose an angle corresponding to the angle of the cone, and that the laser head (15) is driven in a rotating manner around the second axis of rotation (8).

32. Guidance device according to claim 1, characterized in that the swiveling angles (α,β) at the horizontal swiveling axes (11, 14) are programmed to be adapted in such a way to each other that the point of impingement (27) of the laser beam (17) is located upon the workpiece surface on the imagined extension of the central aixs of the telescopic installation (3).

33. Guidance device according to claim 14, characterized in that between the two swiveling axes (11, 12) the laser beam is guided through an additional telescopic installation (16) controlled to be changeable in length with formation of an additional movement axis (6).

* * * * *